(12) United States Patent
Haynes

(10) Patent No.: US 12,185,649 B2
(45) Date of Patent: Jan. 7, 2025

(54) COMPACT, EXTENSIBLE, TRACK LAYING, AGRICULTURAL TRACTOR

(71) Applicant: David Haynes, West Jordan, UT (US)

(72) Inventor: David Haynes, West Jordan, UT (US)

( * ) Notice: Subject to any disclaimer, the term of this patent is extended or adjusted under 35 U.S.C. 154(b) by 994 days.

(21) Appl. No.: 17/154,409

(22) Filed: Jan. 21, 2021

(65) Prior Publication Data

US 2021/0219481 A1    Jul. 22, 2021

Related U.S. Application Data

(60) Provisional application No. 62/988,034, filed on Mar. 11, 2020, provisional application No. 62/963,912, filed on Jan. 21, 2020.

(51) Int. Cl.
*A01B 63/00* (2006.01)
*A01B 75/00* (2006.01)
*B62D 49/06* (2006.01)

(52) U.S. Cl.
CPC .......... *A01B 63/008* (2013.01); *A01B 63/004* (2013.01); *A01B 75/00* (2013.01);
(Continued)

(58) Field of Classification Search
CPC ....... A01B 63/08; A01B 63/004; A01B 75/00; B62D 49/0607; B62D 49/065; B62D 49/0678

See application file for complete search history.

(56) References Cited

U.S. PATENT DOCUMENTS 1,878,855 A     9/1932  Johnston
2,677,321 A  *  5/1954  Ferguson ............... A01B 39/06
                                              172/720
(Continued)

FOREIGN PATENT DOCUMENTS

CN        203752803           8/2014
GB        2078640 A  *  1/1982  ............ A01M 7/005

OTHER PUBLICATIONS

Jim Watson Equipment,. Personnel Carrier, [retrieved on Jan. 25, 2024]. Retrieved from the Internet <URL: https://jimwatsonequipment.com/product/personnel-carrier/ (Year: 2018).*

(Continued)

*Primary Examiner* — Jacob D Knutson
(74) *Attorney, Agent, or Firm* — Pate Nelson & Hill; Daniel P. Nelson

(57) ABSTRACT

A tractor includes a frame defines longitudinal (nominally forward and backward), lateral (nominally left and right), and transverse (nominally up and down) directions (mutually orthogonal). First and second side structures connect by a width adjustment structure comprising beams of bearing length and bearing width capable of supporting loads (torque, bending, etc.) at any of a plurality of widths therebetween. Individual drive systems in the first and second sides each include a track, motor, sprocket, main idler, and bogey idlers. A carrier system secures, lifts, and descends an implement. Implements may be of any type, such as tillage, harrowing, furrowing, seeding, cultivation, personnel carrier, or the like. A controller is capable of directing the tractor based on a pre-determined course of travel, or a guided course in response to physical features in a farming field.

20 Claims, 20 Drawing Sheets

(52) U.S. Cl.
CPC ....... *B62D 49/0607* (2013.01); *B62D 49/065* (2013.01); *B62D 49/0678* (2013.01)

(56) References Cited

U.S. PATENT DOCUMENTS

| | | | |
|---|---|---|---|
| 2,788,858 A * | 4/1957 | Aasland | B62D 53/02 |
| | | | 180/209 |
| 2,796,140 A * | 6/1957 | Knolle | A01B 51/026 |
| | | | 180/311 |
| 3,017,942 A | 1/1962 | Gamaunt | |
| 3,532,397 A | 10/1970 | Johnson | |
| 3,946,822 A | 3/1976 | Dohse et al. | |
| 4,226,292 A | 10/1980 | Monte et al. | |
| 4,306,630 A | 12/1981 | Monte et al. | |
| 4,363,374 A * | 12/1982 | Richter | B62D 49/0607 |
| | | | 180/209 |
| 4,519,465 A | 5/1985 | Triplett | |
| 4,897,987 A * | 2/1990 | Spalla | B62D 55/06 |
| | | | 56/16.7 |
| 4,942,934 A | 7/1990 | Moriarty | |
| 5,135,427 A | 8/1992 | Suto et al. | |
| 5,240,084 A | 8/1993 | Christianson | |
| 5,273,126 A | 12/1993 | Reed et al. | |
| 5,462,122 A | 10/1995 | Yamamoto et al. | |
| 5,921,843 A | 7/1999 | Skrivan et al. | |
| 6,523,636 B2 | 2/2003 | Chatterjea | |
| 7,185,958 B2 | 3/2007 | Ueno | |
| 7,997,666 B2 | 8/2011 | Bordini | |
| 8,844,665 B2 | 9/2014 | Wenger et al. | |
| 9,440,691 B2 | 9/2016 | Rosenboom | |
| 9,505,454 B1 | 11/2016 | Kautsch | |
| 9,603,297 B2 | 3/2017 | Roy | |
| 2010/0236844 A1 | 9/2010 | Howe et al. | |
| 2011/0074210 A1 | 3/2011 | Paradis et al. | |
| 2018/0243771 A1 * | 8/2018 | Davis | A01B 63/004 |
| 2018/0338413 A1 * | 11/2018 | Connell | A01B 63/008 |
| 2019/0176911 A1 * | 6/2019 | Beitzen-Heineke | |
| | | | B62D 49/0678 |
| 2020/0281111 A1 * | 9/2020 | Walter | A01C 7/205 |

OTHER PUBLICATIONS

Jim Watson Equipment Personnel Carrier (Year: 2018).*

* cited by examiner

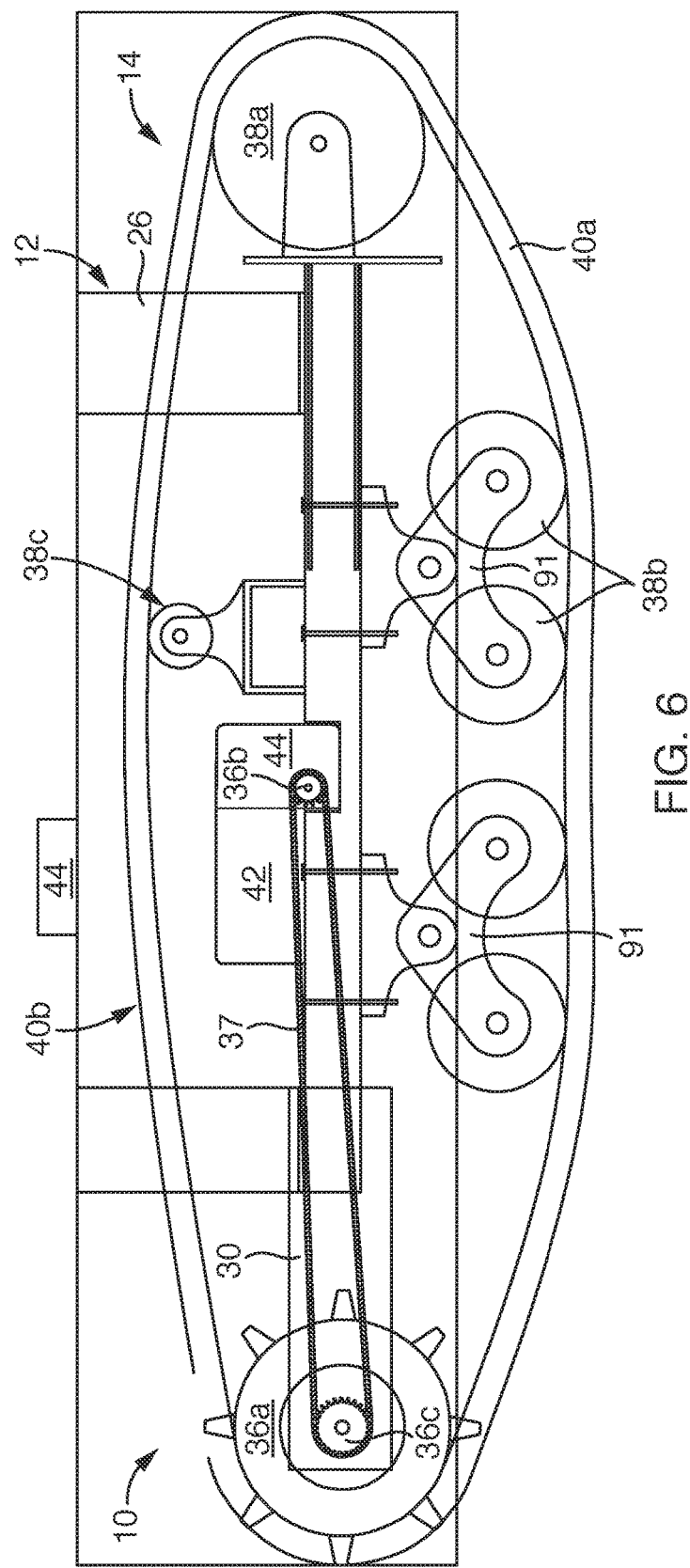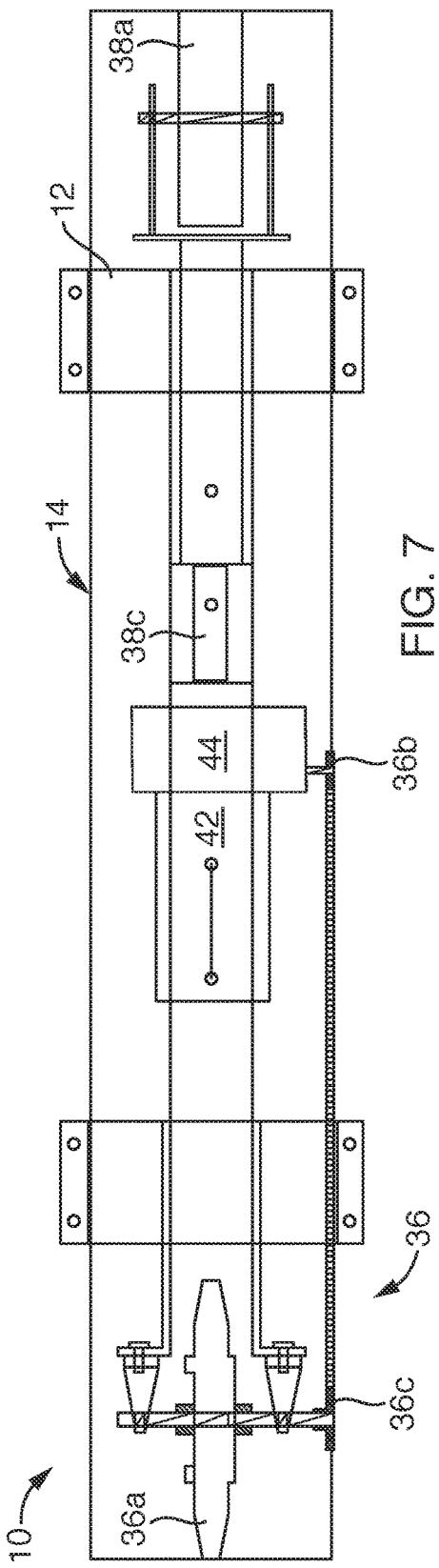
FIG. 6
FIG. 7

COMPACT, EXTENSIBLE, TRACK LAYING, AGRICULTURAL TRACTOR

RELATED APPLICATIONS

This application: claims the benefit of U.S. Provisional Patent Application Ser. No. 62/963,912, filed Jan. 21, 2020 and U.S. Provisional Patent Application Ser. No. 62/988,034, filed Mar. 11, 2020. This application also hereby incorporates herein by reference the following patents: U.S. Pat. No. 9,603,297, issued Mar. 28, 2017; U.S. Pat. No. 3,017,942, issued Jan. 23, 1962; U.S. Patent Application Serial No. 2011/0074210, published Mar. 31, 2011; U.S. Pat. No. 7,997,666, issued Aug. 16, 2011; U.S. Pat. No. 7,185,958, issued Mar. 6, 2007; and U.S. Pat. No. 9,440,691, issued Sep. 13, 2016.

FIELD OF THE INVENTION

This invention relates to agriculture and, more particularly, to novel systems and methods for tractors.

BACKGROUND ART

"Intensive vegetable production" refers to a system of marketing and producing vegetable crops in which attention is placed on detail and optimization. For example, land, capital, labor, equipment, transportation, management time, and the like are finite resources. Farms operating under this principle seek to maximize profit and typically on a comparatively smaller plat of ground.

Typically, such farms are run by a small group, a family, individual, or the like near (a few miles from) a particular market. In fact, production seasons and personal interest may actually control what the crops will be. Likewise, localized markets or "farmers' markets" are typically the direct retail outlets for such a "micro farmer" who is responsible for ground preparation, planting, cultivation, harvesting, and selling such a product with unique freshness and minimal processing and transportation.

Accordingly, with smaller plats or plots of ground, crops may be diversified according to seasons. A sequence of ripening or market readiness governs an early crop, other crops in the late spring, early summer crops, midsummer, and ultimately fall crops, or even early winter crops. Such intensive production, because it occurs in a very concentrated area may substantially improve net "per-acre" profits.

Necessarily, a five acre farm or ten acre farm will not warrant the equipment of a five thousand or ten thousand acre farm. Similarly, conventional agricultural crops grown in such large tracts are not given the individualized attention that "truck farming," as vegetable growing may be called, might require or benefit from.

Many growers (farmers, gardeners, users, operators) may operate with hand motivated (moved) cultivation equipment. Others may use variously available power tillage equipment such as "rototillers," carriers, walk-behind tractors, and the like. These are typically wheeled vehicles capable of carrying one or more implements for working the ground and the crops. However, large (weight, size, horse power) engines, frames (multiple tons), wheels, and resulting ground pressure may compact, churn, and otherwise waste much space for the simple processes of passage along furrows or turning around at the ends thereof. Transportation of tractors can be a colossal problem of its own.

Thus, there is a need for small, modestly powered (under a few or single digit horse power) motors or engines in small tractors having comparatively low ground pressure (less than tons per square foot) in intensive agriculture or "intense vegetable production" It would be an advance in the art to provide such a tractor, adaptable to carrying multiple implements, including providing carriage of an operator in order to be able to hand weed, or hand harvest vegetables on a comparatively small (on the order of less than twenty acres, typically less than ten acres, and often less than five acres).

It would also be an advance in the art to provide reduced ground pressure by creating a comparatively lightweight (under tons) of weight, with a ground pressure of mere pounds per square inch rather than hundreds and even thousands of pounds. It would be an advance in the art to provide a tractor of such size as would cover a single raised bed, or several rows, at an arbitrary spacing.

That is, different vegetable crops need different amounts of light, air, height, spacing, and so forth. It would be an advance in the art to provide a track layer as a tractor having an adjustable width to match the spacing of furrowing beside raised beds, or groups of furrows to be intensively cultivated by an operator. It would be an advance to have such a tractor that could be narrowed for transplant in a small trailer or bed of a pickup truck, then deployed to an operating width.

BRIEF SUMMARY OF THE INVENTION

In view of the foregoing, in accordance with the invention as embodied and broadly described herein, a method and apparatus are disclosed in one embodiment of the present invention as including a track system. A tractor in accordance with the invention may use a comparatively lightweight, such as a reinforced-rubber type of track as available in some industrial equipment and some agricultural equipment.

For example, a track hoe (excavator) may be very large, dozens of tons in weight. It may operate on a track made up of multiple tread pieces bolted to a sprocket chain or center rail. That sprocket chain, together with the metal tread pieces, forms a track laying system on which idler (non-powered) wheels or rollers operate. In a sense, a track layer lays down a track forming a road bed for comparatively small diameter wheels to roll along. Typically, the wheels are of such a diameter and such a configuration that they would otherwise typically sink into the ground. One may think of a large "crawler tractor" or combat tank as a track laying vehicle. It is very large, on the order of many dozens of tons in weight.

In accordance with the invention, a track laying tractor in accordance with the invention may use a comparatively light track weighing from a hundred pounds to a few hundred pounds. Along that track, a bed, idler-type roller wheels roll. The track is driven by a powered sprocket and carried at an opposite end by a main idler. In some embodiments, a tractor may have a drive sprocket higher than the fore and aft ends, each of which then has a large idler.

In certain embodiments of a system in accordance with the invention, the tractor may be fabricated rather than cast. Most tractors, especially agricultural and industrial tractors are formed with a main housing in order to provide a very stiff framing structure. From this main housing will extend an engine that is also cast, or at least the engine block is and several components. The main housing typically holds gears and shafts connecting the engine to axles for wheels. Weights are in the tons (2-10 t), depending on power capacity and pulling capacity.

Crawler tractors are different primarily in that they include tremendously more weight, on the order of up to dozens of tons. Thus, in order to reduce weight, a tractor in accordance with the invention may be formed in two principal parts, a right hand unit and a left hand unit that are substantially mirror images of one another.

A track may be driven by sprocket, and carried on an idler at an opposite end of the "endless belt" track. The turning diameter of the track at its fore and aft ends may be driven by a sprocket at a leading end (or trailing) and an idler filling the bend diameter of the track at an opposite end. Between the sprocket and the idler may be several smaller idler wheels (unpowered) typically paired on a rocker or compensator. Pairing the roller wheels on each side helps to accommodate small bumps in the level of the ground or soil over which the tractor will pass.

The track assembly, along with a motor and drive components form the drive system in each side of the tractor. Meanwhile, controllers, power sources (typically batteries, but possibly a fueled engine) drive each track at its own speed in order to effect forward motion, turning, rearward motion, and so forth. The tractor is benefited by fabrication from pillars and beams forming a frame, each connection having a suitable bearing length (maximum contact length) as well as a bearing width (maximum contact width) providing suitable stiffness, while proving a large open area between the tracks.

Above the tracks may be a superstructure. The frame may include the frame for the drive system (tracks, rollers, motor, etc.) as well as a superstructure containing and supporting such items as batteries, controls, lift systems for a tool bar (implement carrier), and so forth.

Implements carried by the tractor may be secured by adapters to an implement carrier, or may be conventional implements such as cultivators and the like fixed to a "tool bar" extending between the two sides. A lift mechanism for the tool bar may provide for adjusting the height of any attached implement with respect to the ground to be worked. Some implements may be mounted on a frame secured to the implement carrier, and may or may not carry their own power source.

For example, a flame weeder will need a source of heat, typically a propane burner fed by a propane tank carried in or on the superstructure of the tractor. Similarly, certain cultivators may be motorized in order to rely on their own motive means (e.g., gasoline or propane engine) rather than the forward speed and power of the tractor itself. In certain embodiments, the tractor itself may simply act as a carrier for implements, providing only motion, not being relied upon for the power of tillage.

In fact, in many situations, actual contact with the crop or the ground is done by hand. Nevertheless, in some embodiments, a power takeoff from the tractor may power an implement needing, for example, rotation of tines or tillers.

The tractor may be made in two halves, almost mirror images of each other. These may be attached together by cross beams at any of several available widths, including zero distance. Thus, the tractor may be narrowed to fit into a small trailer or even the bed of a pickup truck. The tractor may include a frame defining longitudinal (nominally forward and backward), lateral (nominally left and right), and transverse (nominally up and down) directions (mutually orthogonal). It may have first and second side structures and a width adjustment structure comprising beams, each characterized by a bearing length and bearing width selected to be capable of operably connecting to the first and second side structures to fix the first and second side structures with respect to each other at each of a plurality of widths therebetween. First and second drive systems may be secured within the first and second side structures, respectively, each comprising a track operably connected to a motor capable of driving the track independently. A power supply (or multiples) may be operably connected to power the motors.

The tractor includes a carrier system comprising an implement connector on each of the first and second side structures capable of selectively securing and releasing an implement to be carried by the tractor. An implement carrier is capable of mechanically adapting the implement to the implement connector. At least one of the implement carrier and the carrier system is capable of adjusting transversely to selectively engage and disengage the implement with a ground surface therebelow. A power delivery mechanism is typically operably connected between the frame and the implement to provide energy to the implement. It may rely on a fuel supply mechanism and a mechanical energy mechanism (motor, generator, etc. or the like) capable of delivering energy distributed over time.

Implements may include a personnel carrier capable of positioning a rider in sufficient proximity to a surface of ground therebelow to be capable of facilitating hand work by the rider and directed to a crop in the ground. A controller, in certain embodiments are operably connected to control travel and turning of the tractor by controlling the motors individually. The controller typically comprises a processor capable of receiving programming instructions capable of directing the tractor based on at least one of a pre-determined course of travel and a guided course of travel in response to physical features corresponding to a farming field being serviced by the tractor.

A communication system may be operably connected to communicate instructions to the controller. This may support operations including lifting or descending the implement, turning the tractor, controlling speed, and so forth.

A method of operating a tractor, may rely on providing a tractor comprising a frame, drive systems, a power supply, and a controller, wherein the frame defines longitudinal (nominally forward and backward), lateral (nominally left and right), and transverse (nominally up and down) directions, all mutually orthogonal. The frame comprises first and second side structures and a width adjustment, wherein the width adjustment comprises beams, extending laterally between the first and second side structures and each characterized by a bearing length and bearing width selected to be capable of operably connecting to fix the first and second side structures with respect to one another at each of a plurality of widths selectable therebetween.

First and second drive systems are secured within the first and second side structures, respectively, each comprising a track operably connected to a motor capable of driving the corresponding track independently, and even under either independent control or synchronized control. The method includes selecting a width corresponding to a spacing of furrows in soil corresponding to ground therebelow, adjusting the width adjustment to position the tracks to correspond to the spacing. Later, another width corresponding to another spacing of other furrows may be set, adjusting a distance between the first and second side structures to correspond to the other furrows by operating the width adjustment, thus enabling operating the tractor with the tracks in the other furrows.

After connecting an implement to the frame, one may control the first and second drive systems individually along the furrows. A controller is capable of controlling the drive systems to pass along adjacent portions of the ground in sequence. A power supply is operably connected to power the motors. The controller will typically to do at least one of guiding the tractor based on data representing a mapping of the furrows and guiding the tractor based on detecting a physical feature corresponding to the furrows. The feature may be created by a sign or other marker placed at selected locations to be detected, tracked, or the like.

A carrier is capable of engaging an implement to be operated with the tractor; and at least one of the implement and the carrier is capable of controllably lifting and lowering the implement with respect to the tractor for engaging with the soil. At least one of the implement and the tractor comprises an implement carrier capable of mechanically adapting the implement to the tractor for operation. At least one of the implement carrier and the tractor is capable of adjusting the implement transversely to selectively engage and disengage the soil therebelow.

An apparatus capable of operating as a tractor, may include a frame defining longitudinal, lateral, and transverse directions mutually orthogonal, and first and second side structures capable of interconnecting by a width adjuster extending in a lateral direction. A width adjuster may be made of beams, each characterized by a bearing length and bearing width selected to be capable of operably connecting to the first and second side structures to fix the first and second side structures with respect to each other at each of a plurality of widths therebetween. First and second drive systems are secured within the first and second side structures, respectively, each comprising a track operably connected to a motor capable of driving the track.

A power supply operably is connected to power the motors. A carrier system supports an implement and moving the implement selectively into engagement with the ground and out of engagement therewith. A power delivery mechanism operably connected between the frame and the implement to provide energy to the implement, wherein the power delivery mechanism is selected from a fuel supply mechanism and a mechanical energy mechanism capable of delivering energy distributed over time. A controller is operably connected to control travel and turning of the tractor by controlling the motors individually, wherein the controller comprises a processor capable of receiving programming instructions capable of directing the tractor based on at least one of a pre-determined course of travel and a guided course of travel in response to physical features corresponding to a farming field being serviced by the tractor.

A communication system is operably connected (wired, wireless, broadcast, or any suitable mechanism) to receive instructions from a location remote from the tractor and communicate the instructions to the controller. The drive system comprises the motors operably connected to drive sprockets corresponding thereto and operably connected to drive the tracks about the sprockets and corresponding idlers. The frame is supported by bogey wheels capable of rolling along the tracks.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 6 is a side elevation view of one embodiment of a drive system for a tractor in accordance with the invention;

FIG. 7 is a top plan view thereof;

FIG. 18 is an array of side elevation views of various alternative embodiments of the lift mechanism of FIG. 17, this illustrating hydraulic actuator, a winch or rolling drum, a ball screw, a simple fixed adjustable link, and a hand-levered lift mechanism as a manual lift and adjustment device for the support or rack adapted to carry an implement, wherein FIG. 18A illustrates a basic, leveraged, hydraulic lift on a link;

FIG. 18B illustrates a hydraulic cylinder and extendable shaft;

FIG. 18C illustrates a flexible link on a drive winch or roller, where the flexible link may be a chain, cable, or the like;

FIG. 18D illustrates a ball screw with motor, screw, and bearing nut;

FIG. 18E illustrates an adjustable manual link;

FIG. 18F illustrates a manual lift lever operating on a link elevating and descending the rack;

FIG. 20 illustrates various alternative embodiments for potential diagonal bracing of the frame or other structures of a tractor in accordance with the invention;

DETAILED DESCRIPTION OF THE PREFERRED EMBODIMENTS

Figure 1:
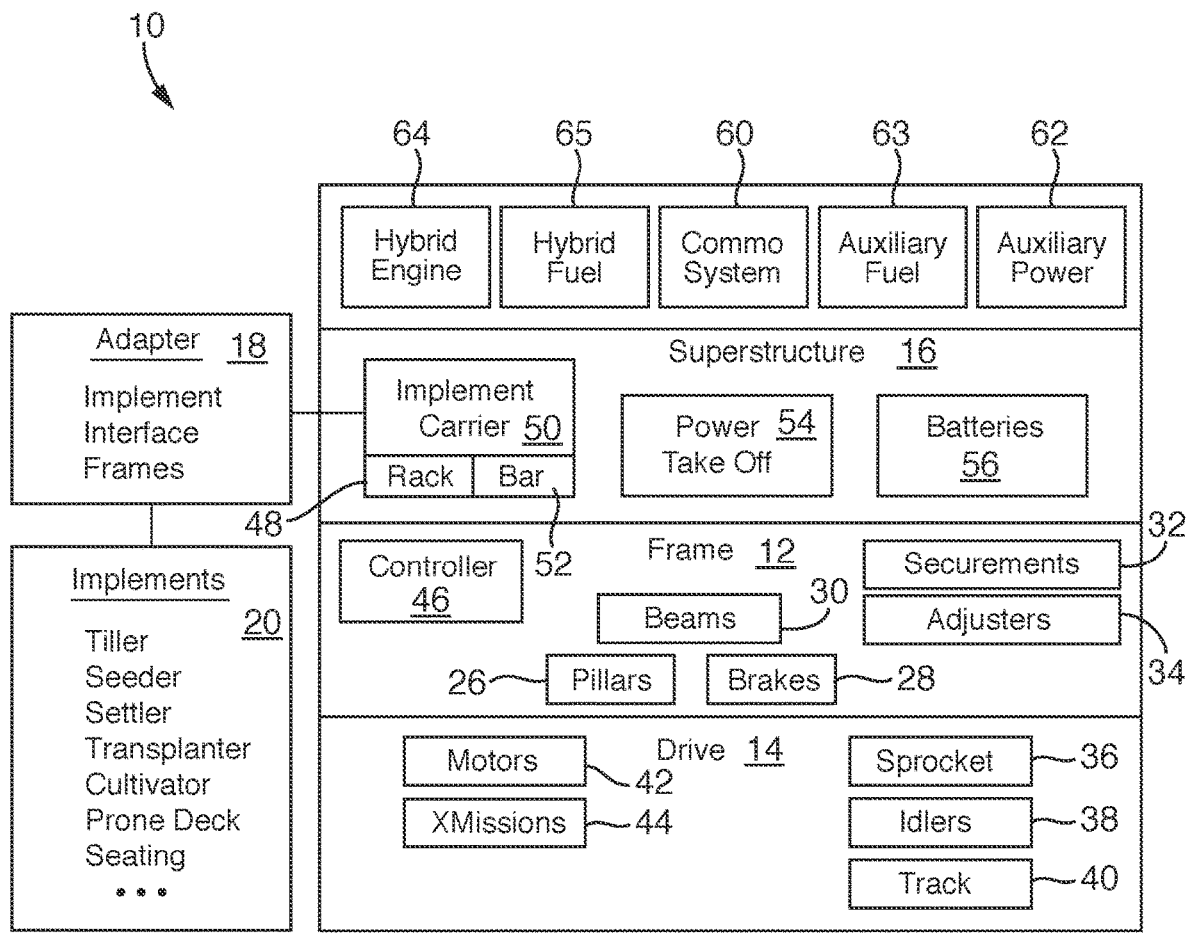
FIG. 1 is schematic block diagram of a system in accordance with the invention for providing a tractor for small scale farming using track laying rather than wheeled traction systems.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of systems and methods in accordance with the invention. The illustrated embodiments will be best understood by reference to the drawings, wherein like parts are designated by like numerals throughout. A trailing letter, in every instance herein is simply an instantiation of an item identified by its leading numeral.

Referring to FIG. 1, a tractor 10 or tractor system 10 in accordance with the invention may include a frame 12 as a major subsystem 12 structurally supporting the other components. The frame 12 is extensible in a horizontal direction in order to adjust the drive system 14 or the individual drives 14 for the width at which they will operate. This width may vary in a particular plot of ground or a particular farming arrangement due to individual furrows in some instances, raised beds in other situations, and a difference in width between a selected group of furrows or raised beds, the widths depending on operational efficiency, the plants growing there, and so forth.

The frame 12 may be considered to include or to support a superstructure 16. That is, the superstructure 16, in general, may be a portion of the frame 12. In alternative embodiments, the frame 12 may mainly support the drive system, and the superstructure 16 thereabove.

As a practical matter, the frame 12 may be composed of various pillars 26 extending vertically, braces 28 extending horizontally whether longitudinally along the length of the tractor 10 or laterally across the width of the tractor 10.

As a practical matter, a tractor 10 needs a mechanism such as an interface 18 or an implement frame 18 to fit and support an operating implement 20. Numerous implements 20 are used in agriculture, for tillage prior to planting in various ways. Deep tilling, shallow tilling, harrowing, leveling, furrowing and the like may be required of certain implements 20. Meanwhile, seeders or seed drills may be required to complete seeding. Various types of rollers or drags may be used as implements 20 to assure that seeds are buried and the soil is slightly compacted around them to urge warming in the sun and accessibility to moisture for germination.

Similarly, cultivators of various types whether forks, tines, rotary tillers, "tilthers," cultivating shoes (e.g., goose foot, etc.), other weeders, and the like may also be used. Meanwhile, before or after a field bed is prepared, by seeding, it may be valuable to use a flame weeder that presents heat along the surface of the ground in order to kill any weeds that have emerged prior to seeding or prior to germination. Thus, in general, implements 20 may be carried on the interface 18 or implement frame 18 supported by the frame 12, superstructure 16, or both of a tractor system 10 in accordance with the invention.

In one currently contemplated embodiment, a guidance system 22 may support the tractor 10 operating completely independently or quasi independently. That is, with a comparatively slow speed (e.g., feet or fractions per minute, not miles per hour), various mechanisms for determining position, either from a global positioning system, calculation, measurement system, targets, survey, memory, training, or the like, the guidance system 22 may direct a tractor 10 along its predetermined path without the need for frequent human intervention.

In some embodiments, additional (e.g., diagonal) braces 28 may be used to extend between beams 30 that are joined, or between pillars 26 and beams 30 to which they are joined. As a practical matter, open spaces between the principal halves or sides of a tractor in accordance with the invention are preferred. Likewise, certain width adjustability may be complicated if braces 28 are included in the structure.

Various securements 32 may be used as fasteners 32 to secure one part to another. In certain embodiments, and at certain locations on a tractor 10, welding may be a suitable mechanism for securing the frame 12 together. In other embodiments, bolts, rivets, screws, pins, and the like may be used for permanent or temporary fasteners 32 between components and the tractor 10, or to secure implements 20 to an interface 18 carried by the tractor 10.

To the same extent that selected securements 32 may be required, adjusters 34 may be used to adjust the height of an implement 20 in order to perform effectively, or to extend beams 30 laterally on a tractor 10 in order to adjust width of the tractor 10.

The drive 14 may include various sprockets 36. For example, a sprocket 36*a* may be a main sprocket for a drive system 14. Meanwhile, in order to adjust speeds, or ratios, a gear drive may be used, or motor sprockets 36*b* and terminal sprockets 36*c* may be required. For example, a chain 37 may connect the motor sprocket 36*b* and the terminal sprocket 36*c* that effectively drives a sprocket 36*a*.

Meanwhile, a tractor 10, and the drive system 14, particularly, will require idlers 38. These are of multiple types, including a carrier idler 38*a* that operates opposite a main drive sprocket 36*a* to carry a track 40 and to advance that track 40. The main sprocket 36*a* drives the track 40 while the idler 38 at an opposite end of the track 40 maintains alignment and returns the track 40 to the sprocket 36. Thus, a main carrier idler 38*a* fits opposite the main carrier sprocket 36*a* on the drive system 14, while rollers 38*b* or roller idlers 38*b* literally support the weight of the tractor 10 on the track 40. The track 40 forms something of a road on which the rollers 38*b* may move in a longitudinal direction of motion of the tractor 10.

A tensioner idler 38*c* sometimes referred to simply as a tensioner 38*c* will typically be required. Often, multiple tensioners 38*c* are required to lift the upper course 40*a* of the track 40 away from equipment, and also to maintain tension along the longitudinal direction 11*a* of the track 40. Thus, in general, the track 40 (circulating through a lower course 40*a* and upper course 40*b*) may be defined by the longitudinal direction 11*a*, the vertical direction 11*b*, and a lateral direction 11*c*, all mutually orthogonal.

A motor 42 may drive the track 40 and a transmission 44 may adjust an output speed for a shaft of a motor 42. This will provide the proper "gearing," optimize performance of a motor 42, and select the range of speed of the track 40 in the drive system 14.

In certain embodiments, the controller 46 may directly or indirectly to operate to control the motors 42 of which there will be one in each side or each half of the tractor 10. The controller 46 may be operated remotely, or programmatically. Thus, the controller 46 will typically involve or require a processor for processing capability.

In addition, the controller 46 may also control several motors, hydraulic systems, hydraulic pumps and motors, or other actuators to effect motion or other activities by the tractor 10. For example, one needs to control the drive 14 as to direction, speed, turning, lifting implements 20 and the like. For example, the implement frame 18 or interface frame 18 will require some degree of adjustment but need not necessarily rely on the controller 46 for such activity.

For example, the support 48 or rack 48 is effectively a significant portion of an implement carrier 50 to support implements 20 drawn by the tractor 10. To that end, a tool bar 52 or multiple tool bars 52 may cross laterally 11*c* between the two drive systems 14 and superstructure 16 to support various tools 20. In some embodiments, a tool bar 52 may actually be some type of a frame 18 that fits into the implement carrier 50 to be raised and lowered with respect to the frame 12 of the tractor 10.

For example, a tool bar 52 may be a conventional standard. However, implements 20 may be selectively fastened or unfastened to any suitable interface 18 for use. This configuration may be selected in correspondence to conventional agriculture. However, many specialty implements 20 may now require their own specialized tool bar 52. It may be an integrated portion or as a customized portion 52 for securement as implements 20 to the implement carrier 50 of the tractor 10.

Provisions may be made for a power takeoff 54 (PTO). A power takeoff may also be specialized to a particular tool bar 52 or interface frame 18 corresponding to a particular implement 20. Implements 20 that use large amounts of power (compared to the tractor 10) may actually have their own electrical motors or gasoline engines actually present. Such may be integrated with the implement 20, mounted on their interface frame 18, or otherwise as a separate mechanism. To drive the moveable, typically rotary, components of such an implement 20, a PTO may be positioned optimally.

On or within the superstructure 16 above the drive system 14 will be batteries 56. In some embodiments, it is possible that the batteries 56 may be located down between components of or near the drive system 14. However, given the requirements for suspension, track 40, rollers 38*b* and the like, the batteries 56 will typically be easiest to maintain, access, and support if located somewhere on or within the framing 12 of the superstructure 16 above the drive system 14.

Figure 2:
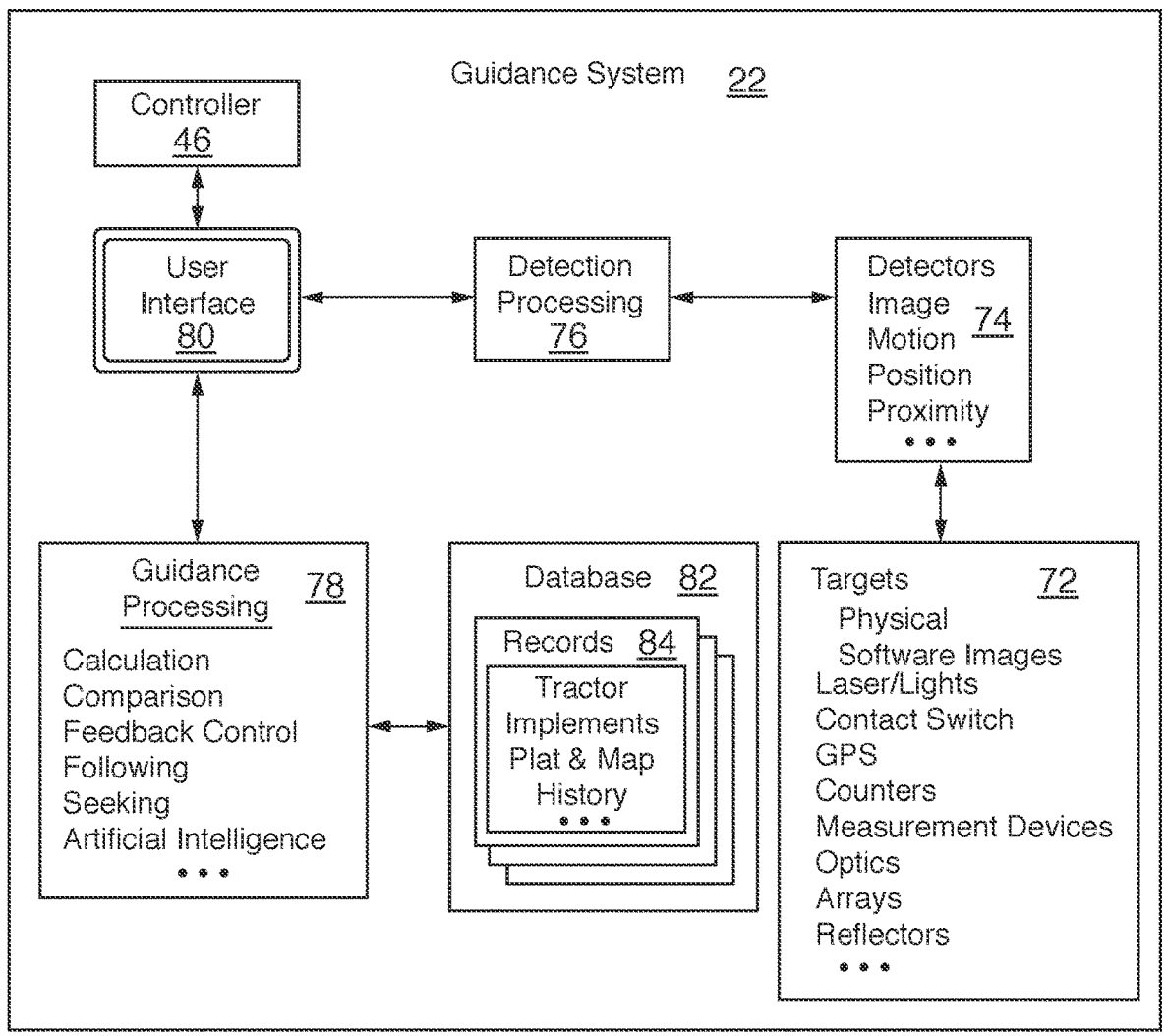
FIG. 2 is a schematic block diagram of a guidance system for the tractor system of FIG. 1.

Referring to FIG. 2, while recalling FIG. 1, and FIGS. 1 through 25 generally, in currently contemplated embodiments, a communication system 60 may be operably connected to the controller 46 in order to provide instructions from a remote user, remote work station, server, database, or the like. Communication 60 may be used to provide programming inputs or programs to the controller 46, and then leave the controller 46 to operate autonomously.

In other embodiments, the communication system 60 may provide individual commands to a controller 46 from a console at which a user may input commands. Alternatively, or in addition, a server operating a command algorithm may make decisions based on inputs received from a database 82, the tractor 10, etc. and then processed and communicated 60 back to the controller 46 for execution.

An auxiliary power system 62 may be provided. It may provide fuel for a flaming weed eradicator, mechanical power, electricity, or the like. Accordingly, an auxiliary fuel tank 63 may be required. In certain embodiments, for longer term use of the tractor 10, the motors 42 may be supported by a hybrid engine 64 recharging the batteries 56. This provides the possibility for a hybrid engine 64 to operate at its most efficient speed and load, while recharging the batteries 56. This allows them to support the maximum torque of the motors 42. Starting torque is the strong suit of electric motors. Storing energy may be necessary when motors 42 are lightly loaded or unloaded, in order to deliver maximum power output when needed.

Electric trains used in commerce today are typically powered by generators supported by diesel engines. Thus, trains are hybrid systems in that they use both a petroleum fueled engine 64, generator 160, and an electric motor 42. However, they do not rely directly on the mechanical power from the engine 64. Here, with a fuel store 65 dedicated to the engine 64, a fully hybrid tractor 10 may be power for times exceeding battery 56 capacity.

In a system and method in accordance with the invention, a controller 46 of a tractor 10 may be programmed to operate completely independently (or quasi independently) during an operating session.

For example, a tractor 10 may be operated by following instructions provided by an internal controller 46. That controller 46 may be programmed to operate independently of an operator by simply mapping and following the map of a plat (plot, farm ground, etc.). Artificial intelligence, beyond the scope of discussion here, has provided coated for self-driving vehicles. It can be expected to provide more ability to navigate space based on detection of terrain, turns, and processing of images.

However, it is currently contemplated that a system 10 in accordance with the invention may use any suitable type of targets 72 designating rows 102, furrows 106, boundaries or the like. For example, detectors 76 could include sensors 74 responsible to detect targets 72 indicating predetermined locations. For example, a target 72 may be placed to identify each furrow 106 (see FIG. 9), or periodic ones 106, along which a track 40 is to traverse.

On the other hand, a target 72 may simply be images, signs, QR codes, cube-corner reflectors (simply reflecting light back toward its source). A detector 74 may simply detect or identify a target 72. It (or the controller 46, processor 76, or processor 78) may calculate spatial relationships, orientation, position, speed, direction, boundary, or the like. Programming within the controller 46 (or other processor 76, 78) may originate control data through a communication system 60 to direct the tractor 10 and its implements 20.

Detectors 74 may be of one of various types. For example, closed circuit television cameras have long used CID (charge injection devices) to process images, both stationary and moving. Similarly, charge coupled devices (CCD) have provided arrays capable of detecting 74 images, markers, shapes, and the like. Targeting and tracking systems of each type for military applications are very precise and sophisticated. Such sophistication is not required for a tractor 10 in accordance with the invention. A tractor 10 primarily needs a direction to travel, and some type of feedback control.

Thus, the detectors 74 exist primarily to feed information back to the controller 46 or to an offsite system in communication by the communication system 60. In other words, image recognition technology exists. Targets reflecting light are basic to every garage opener. Lasers, collimated light beams aimed at reflectors, which reflectors send light back toward the detector 74 "focal plane," or other detectors 74 can detect an image. A basic computer algorithm fundamental to first year programming can detect a light and dark space on an image. All that is required is to aim the tractor 10 and its detector 74 toward the center of a dark cross, or a light cross (or other iamge) on a contrasting background.

Thus, targets can be acquired and tracked. Motion can be detected, by detectors 74 capable of seeing targets positioned laterally within a plat or at the boundaries of a plat. Meanwhile, motion can be detected also by the size of a target image as that target 72 looms larger in the focal plane of a detector 74. Position may be determined by calculating relative angles between targets, proximity thereto, passage thereby, or the like.

As a practical matter, the targets 72 may be physical, or may be software images. For example, an operator may operate the tractor 10 along a plot of ground, and control and record precisely the commands and controls for motion of the vehicle. Such techniques have been used for teaching robots in automobile manufacturing plants for over fifty years. That is, by simply "walking" (stopping, advancing, coursing) a robot through its various positions and motion, one may carefully track and record with sufficient precision. One may then program the tractor controller 46 to repeat the motion, retracing the path by the robot 10.

On the other hand, lasers and light beams are available. Each is different. A laser involves coherent light that does not tend to spread. It stays along a linear path, except to the extent that atmospheric impurities or water may scatter the light somewhat. Meanwhile, conventional lighting of almost any type may be placed behind a collimator. A collimator permits light to pass only parallel to the collimator through a bundle of small closely packed tubes, often sharing walls and looking something like honeycomb in cross section.

Accordingly, any light that is "off-axis" will strike an anodized or otherwise absorptive coating on the collimator tubes, thereby being absorbed and not permitted to pass out of the collimator. Collimators are useful when conventional (non-laser) light is used as a signal. It is reflected back by a reflective target 72 (e.g., cube corner, glass beads, glass spheres, etc.), to a detector 74 co-located with the signal center. In this way, a very simple system for tracking a target 72 may be implemented very inexpensively.

Thus, a combination of a light or other signal sender at some location on the tractor 10, may collimate light and send it toward a target 72 at the end of a row. A detector 74 co-located or located in close proximity to the signal sender (light and collimator) very simply receives and detects a reflection to stay on track. Control algorithms are ubiquitous for moving a device toward the center of a target 72 or toward a central one of several targets 72 in an array in order to permit a detector 74 to track that target 72 and guide a tractor 10 toward that target 72. Typically, a detector has an array of sensors that detect when the received light is not centered and controls the tractor 10 to move in an appropriate direction.

Lasers and their detectors are available today for bulldozers and the like in order to track a laser beam projected along a straight path. Accordingly, a detector 74 may be a laser detector, and may rely on a laser on the ground or on the tractor 10, or a laser and a detector 74 in some combination, with our without a target 72 within the field.

Similarly, targets 72 may simply represent contact switches responding to contact or movement by members (components, levers, guides, extensions, etc.) detecting the ground. Contact switching is ubiquitous and has been well developed over several decades. Meanwhile, a process may be programmed with a path, while a global positioning system (GPS) may instruct the controller 46 to control the motors 42 and the tracks 40 accordingly. However, GPS systems do have error in them.

Maintaining numerous readings, a controller 46 for a tractor 10 may be kept on headings to locations, but GPS systems have limits on their accuracy for national security reasons.

Meanwhile, counters, odometers, timers, simple distance counters such as "printed circuit resolvers" on shafts (rotating much as odometers and speedometers operate) may very accurately calculate distance that a tractor 10 has traveled. Such may feed that information back into the controller 46 and the communication system 60 to a central controller 46 offsite.

On the other hand, all programming may be inside the controller 46 and simply detect 74 and feedback information from targets 72 as needed. Various other management devices, including measurement wheels and the like are available. Optics may be employed as needed to focus or project beams. Arrays, such as focal-plane-array technology may be available in "cameras" (image detector) for tracking. Reticles may be provided, and reflectors as discussed hereinabove.

Thus, remotely controlling may be autonomous, interactive by a user actually driving the vehicle 10 remotely, or "trained." Multiple tractors 10 may be hand operated, set along courses to operate in furrows 106. A single operator may operate multiple tractors 10. On the other hand, more or less autonomy may be granted to the controller 46 to control the tractor 10 using targets 72, detectors 74, and the like.

Typically, information from a detector 74 or sensor 74 may be processed by a processor 76. One may represent processing 76 or a processor 76 as the central processing unit and associated peripherals required to provide guidance processing. This processor 78 may include a CPU programmed to make calculations, comparisons, feedback control (comparing one signal sent as a command to the controller 46 with the feedback sent back from the detector 74 indicating compliance), thereby feeding back to send new commands to the controller 46 in order to maintain the tractor 10 on its desired path.

Meanwhile, detectors 74 on or off the tractor 10 may track it by following a beacon on it, a reflector on it, or the like. For example, one simple mechanism for feedback control is to have a laser that periodically flashes toward a cube-corner reflector on the tractor 10, and visible by line-of-sight detection. In this way, a set of three detectors 74 detecting reflections from the reflector type of target 72 on the vehicle will allow triangulation calculations detecting exactly where a tractor 10 is located, how fast it is moving, its direction, and so forth.

Thus, a comparatively simple system of targets 72, detectors 74, and processing 78 provide an ability to track and control the position, velocity, and direction of a tractor 10 in accordance with the invention. Accordingly, the controller 46 itself may be programmed to seek a particular target 72, or to seek a path defined by targets 72 corresponding to furrows 106 or boundaries of a plot of ground.

Artificial intelligence is at present extremely expensive and not likely to be a first choice for use in a tractor 10 in accordance with the invention. However, a comparatively inexpensive mechanism of artificial intelligence, is simply teaching a robot 10 (the tractor 10) its path by having an operator operate the tractor 10 through its path, and thereafter designate markers by software along that path, such that the controller 46 can decide where to turn, at what location, and what direction.

In certain embodiments of an apparatus and method in accordance with the invention, guidance processing 78 may cooperate with a user interface 80 by which an individual operator may interact with, control, record, learn from, or direct a tractor 10 and its implements 20 in accordance with the invention. For example, in the illustrated embodiment, a user interface 80 may be a portable device, such as a hand held device, tablet, laptop computer, smartphone, or the like.

In general, a user interface 80 requires some type of a processor by which to process information, a display, and an input device (such as a keyboard or touch screen) in order for a person to interact with the user interface 80. A user interface 80 may be used to present menus, options, dialogue boxes, selections and so forth to a user. Meanwhile, the user interface 80 may literally display the tractor 10, the plot being cultivated, rows 102 or computer generated schematics of any of the information discussed hereinabove.

In other words, a user interface 80 may literally present the image from a sensor 74 or detector 74 operating as a camera on a tractor 10. Meanwhile, much as drones are controlled or radio controlled airplanes and vehicles are controlled, a user interface 80 may simply involve a control stick and other control buttons. However, as smartphones have become ubiquitous, the ability to display images and receive control messages is available. The user interface 80 may be any computer-supported display and input system that provides inputs, outputs, or preferably both for the tractor 10 through its controller 46 and communication system 60 to receive information and send information.

Typically, the guidance processor 78 and the detection processor 76 process information from the detector 74 and send that information forward. The guidance processor 78 receives and responds through the user interface 80, or directly with respect to the guidance processor 78. Information is exchanged as necessary to monitor and control the tractor 10.

Typically, information is used to program the controller 46, collect data from the detector 74 (both raw and as processed by the detector processor 76 or the detection processing procedure 76) in order to collect, process, store and use information. Typically, a data base 82 may be of any type, such as a relational database 82 of records 84. Those records 84 may reflect technical information about the tractor 10, implements 20, the plat 100 or ground plot 100, maps thereof, maps of paths, or other historical information. This may be regarding either the gardening plot 100 or the tractor 10, the interaction between them, processes, paths, operations, ground levels of the soil surface 104, operating levels of implements 20, and the like.

Accordingly, information needed to be reused may be stored in a database 82, and provided in order to support future programming of the operation of the tractor 10, including its drive system 14, and its implement carrier 50. Any number of variables (information parcels, such as numbers, descriptions, and so forth) may be included in any particular record 84 corresponding to a device, a plat, a person, an implement 20, an activity, a calendar, or the like.

Figure 3:
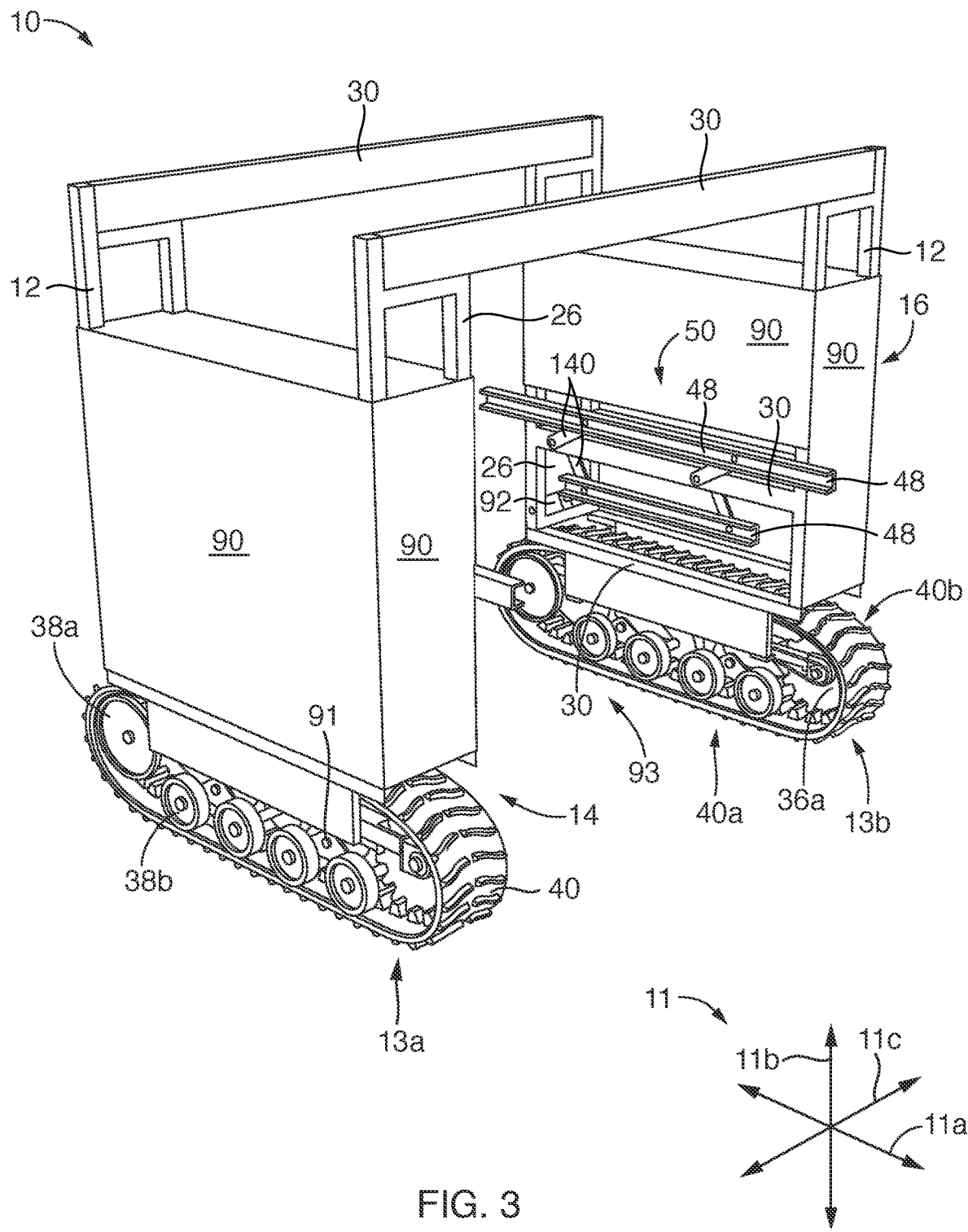
FIG. 3 is a perspective view of one embodiment of a prototype tractor in accordance with the invention.
Figure 4:
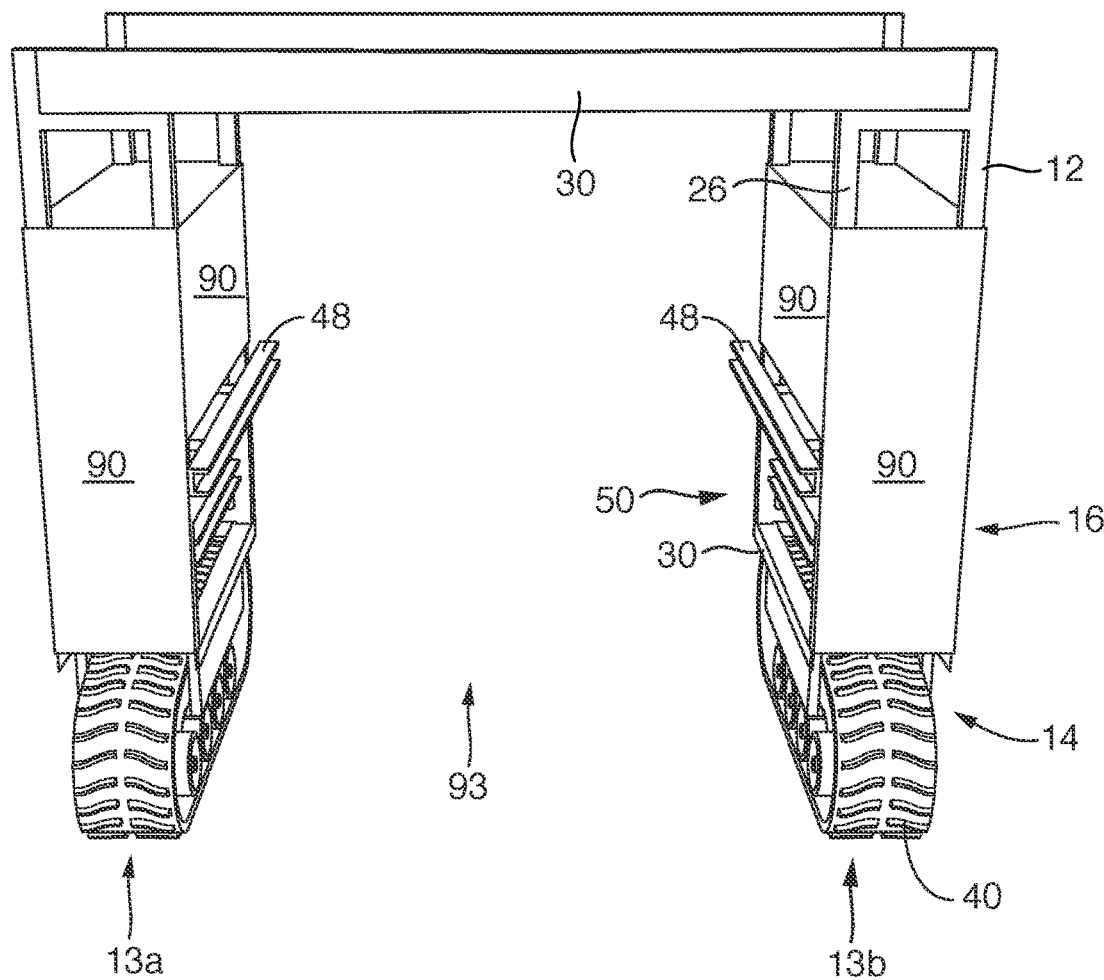
FIG. 4 is a front elevation perspective view thereof
Figure 5:
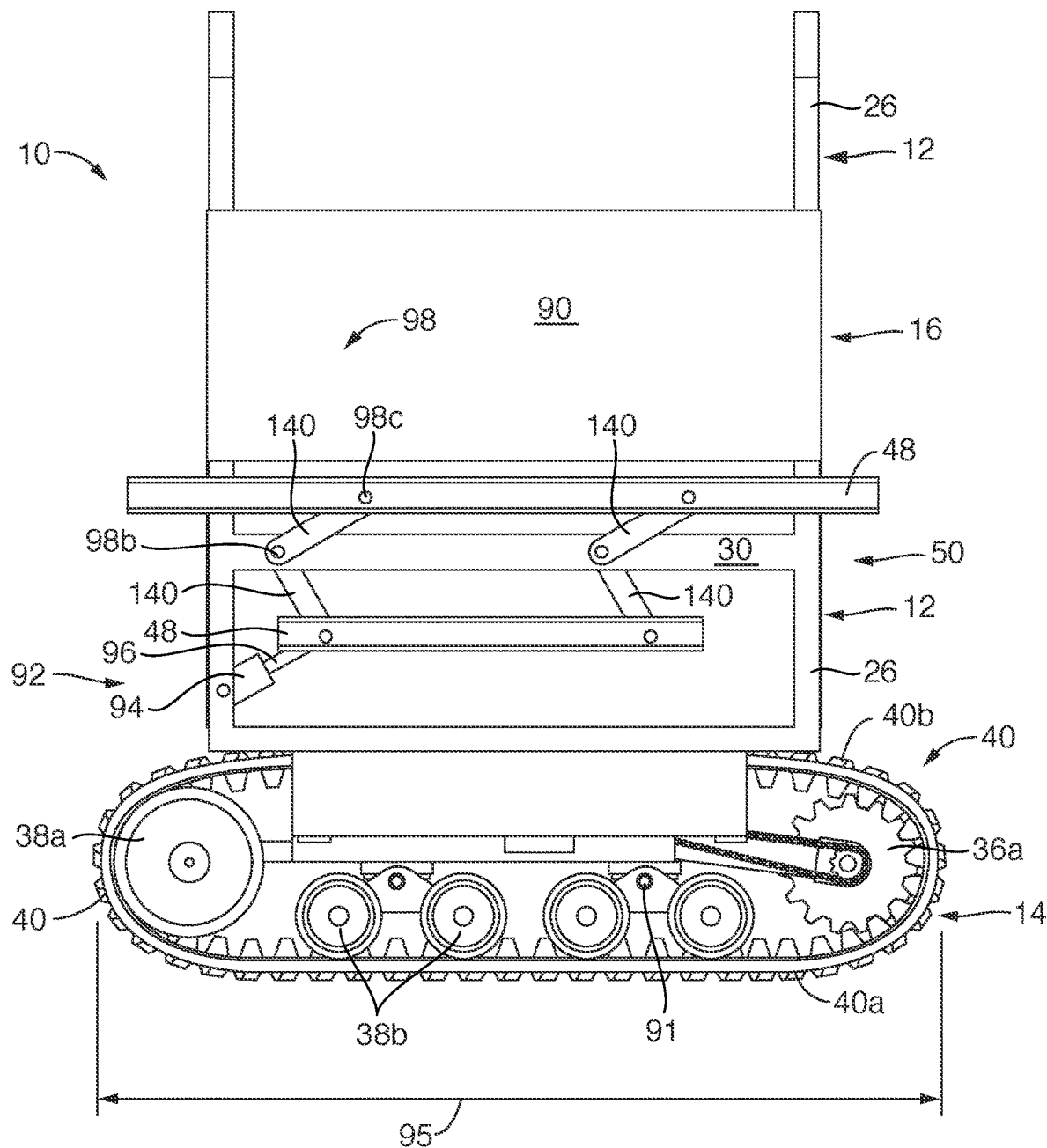
FIG. 5 is a side elevation sectional view from the center of the tractor of FIGS. 1 through 4.

Referring to FIGS. 3 through 5, while continuing to refer generally to FIGS. 1 through 25, a tractor 10 in accordance with the invention may include a frame 12 defining directions 11a longitudinally (forward and back, or advance and retreat), vertically 11b (up and down) and laterally 11c (left and right). A frame 12 may be fabricated from stock (e.g., steel, aluminum, other materials) having particular cross sections. Tubular cross sections are the stiffest and strongest for any particular material and weight. This is due to the principles of solid mechanics indicating that the outermost fiber (outermost position) on any beam in bending takes the maximum stress and the maximum deflection. Thus, for a given weight, a thin rod is a poorer use of material than a tube that would space the same amount of material at some distance from a center line (technically, a "neutral axis") and thereby provide better stiffness, strength, resistance against column buckling, resistance to bending, and the like.

In a system 10 in accordance with the invention, the superstructure 16 may be thought of as the portion of the tractor 10 above the drive 14, although both may be served by the frame 12, or may include portions of the frame 12 therewithin.

An interface 18, may be thought of as an implement frame 18 or an implement interface 18. It is constituted by members secured to the frame 12 in such a way that they may receive an implement 20 or may provide connection means 18 for securing an implement 20 to the frame 12. The implement 20 may be raised and lowered in order to engage and disengage the plat 100 (plat, plot, field, etc. 100) that is the subject of the operation of the tractor 10.

Implements 20 may be any of several types. They may include implements 20 needed for ground preparation, deep tillage, surface tillage such as harrowing and breaking up larger particles, seed bed preparation, seeding, such as drilling, broadcasting, and the like. They may include tools 20 for settling seed such as by disturbing the soil around the seed and slightly compacting it. This provides nutrition, moisture, and access to soil as required to encourage germination and root propagation through the soil 100.

Meanwhile, some plants may be transplanted, and thus need a drill for providing an opening and a delivery system for providing a transplanted seedling plant into the soil 100 at a particular spacing, and the like. Once plants are seeded or transplanted, cultivation (e.g., weeding, aeration, hilling) may be required. Thus, a variety of cultivators from goose foot types of blades, to rotary tines, scrapers, and the like may be used to weed, aerate, or otherwise move soils in order to cover weeds, cut out weeds, disturb soils and aerate them, and so forth.

Unique to intensive farming may be a deck (see FIGS. 24 and 25) for supporting a user in a prone position in order to provide hand treatment, and direct optical observation of plants, such as for weeding, harvesting, or the like. Likewise, a seeding implement 20 may be provided. In general, a tractor 10 in accordance with the invention may include various implements 20, but not all at the same time. In this illustrated embodiment, the drive system 14 below the superstructure 16 relies on a system of sprockets 36, track 40, with the various idlers 38 required to transmit power from a motor 42 to the track 40 in order to move the tractor 10 in any desired direction. Not all components are visible, but will be seen in the schematics of FIGS. 1 and 2, as well as other Figures included hereinbelow.

In this embodiment, the tractor 10 is provided with covers 90 or shielding 90 to protect individuals from the tractor 10, while also protecting plants from incursion into the structures 12, 14, 16 of the tractor 10. Typically, covers 90 provide protection of the plants from being engaged and thereby damaged by components of the tractor 10. Likewise, users and others nearby may be protected against snagging of clothing, pinching of digits, or the like.

In this series of illustrations, one will notice that the idlers 38b are connected to rockers 91 or compensators 91 that limit the motion in a vertical direction 11b of the rollers 38b in order to accommodate some anomalies in the bed surface 104 (see FIG. 9) while still maintaining a substantially level, flat, and straight track 40 along the furrow 106, and particularly the surface 108 of the furrow 106.

Referring to FIG. 5, one will see in particular that the implement carrier 50 (including the rack 48) is secured to a beam 30 of the frame 12 spaced some distance above the drive system 14 by the pillars 26 connected to the beams 30. Various diagonal braces 28 may be used, but are not necessarily present, as will be explained hereinbelow.

One will see that an implement carrier 50 may include one or more racks 48 or supporting racks 48 adjustable in height 11b (vertical direction 11b, up-and-down 11b), in order to adjust an implement 20 with respect to the ground 104. Accordingly, an actuator 92 such as the hydraulic cylinder 94 with its shaft 96 extending therefrom may secure to the implement carrier 50 to raise and lower the racks 48 or supports 48.

Typically, the racks 48 are secured by pivots 98, such as pivots 98a, 98b, 98c to each other, the frame 30, and links 140. Pivoting the links 140 about the pivots 98 such as pivots 98a, 98b, 98c is the extension of the shaft 96 from the hydraulic cylinder 94. As an actuator, it may move a link 140 to a rack 48, which will then pivot around a pivot 98, in order to move up or down. Various conventional four-bar linkages are a basic of engineering, and numerous combinations may be found and implemented. Likewise, a three-bar linkage where one bar or arm has an extensible and retractable length is illustrated.

The distance 95 from "tip to tail" of the track 40 in operation may be selected to optimize one or more of several factors. A longer distance 95 tends to provide space for more idlers 38b or rollers 38b and thereby reduce ground pressure (pounds per square foot or load per unit area) on the surface 108 of a field 100. The surface 108 in a furrow 106 is the path along which the track 40 will move.

On the other hand, the overall length 97 of the frame 12 in a longitudinal direction 11a may permit elevation or lowering of the center of gravity. For example, providing a large open bay area 93 between the tracks 40 in a lateral direction 11c provides clearance to receive implements 20, to pass over crops, and so forth.

In fact, conventional tractors often have difficulties in late stages of cultivation. If the frame of a conventional wheeled tractor is too low, it interferes with the plants that may extend high enough in a vertical direction 11b to interfere or be interfered with.

Referring to FIGS. 6 through 9, along with FIGS. 3 through 5, and considering FIGS. 1 through 25 generally, the tracks 40 may be supported by a tensioner 101 including a loader 102. In general, a loader 102 may include a spring, a hydraulic actuator, or the like, but is typically simply an elastically resilient member lifting against the track 40 a tensioner idler 38c. Multiple tensioners 101, typically two, may be secured to a beam 30 of a frame 12 in a drive system 14. These both lift the upper reach 40b of a track 40 away from the underlying equipment and the frame 12 as well as tensioning the track 40 in its longitudinal direction 11a.

As a practical matter, the tensioner 101 may be best secured to a beam 30 of the frame 12 to push upward 11a against the upper reach 40b of the track 40. This will support and tend to stretch the track 40, that is, stress the track 40. Tensioning is important in order to keep engagement between the main drive sprocket 36a and the engagement portion of the track 40. This provides stable movement and keeps the track 40 centered and engaged on both the sprocket 36a and the main idler 38a. In some embodiments, one may provide a tensioner 101 between the frame 12 and the main idler 38a. However, this is more complicated, requires more force, and is a direct force rather than a vectored force.

That is, for example, a track 40 wrapping around and returning from an idler 38a and a sprocket 36a may be analyzed in a "free body diagram." It must support twice the valve of the force or tension in the track 40. With the track 40 pulling both on an upper edge and a lower edge of each of the sprocket 36a and idler 38a, twice the tension force (longitudinally 11a) in the track 40 is applied to each of these rotating members 36a, 38a.

In contrast, an idler 101 as illustrated lifts in a vertical direction 11b against a horizontal span of the upper reach 40b of the track 40. Thus, the lower reach 40a progresses along the surface 108 of a furrow 106, while the upper reach 40b passes through clear air. Accordingly, just like a high wire, the force vector within the upper reach 40b of the track 40 has a horizontal 11a component and a vertical 11b component. Those relate to the cosine and sine of the angle of that upper reach 40b. Accordingly, one will immediately see that the force applied by a tensioner 101 through the tension idler 38c is comparatively modest, even an order of magnitude less than the actual tension force that will exist in a longitudinal direction 11a on that upper reach 40b of the track 40.

Thus, a tremendous leverage advantage is provided to the idler 38c. It requires much less than the tensioning force in order to provide a tremendous multiplier through the relationship between the sine and cosine of the angle of incidence of the track 40 with respect to the idler 38c applying the force.

One will also note the presence in FIGS. 6 and 7 of the sprockets 36b, 36c, connected to the motor 42 and main sprocket 36a. For example, a chain 37 may pass around the motor sprocket 36b toward and around a sprocket 36c driving the main sprocket 36a. In this system, a transmission 44 between the motor 42 may operate to provide any gearing up or down based on the speed of rotation of the motor 42. If an electric motor 42 is used, the frequency or revolutions per minute of the motor 42 may be comparatively high in the thousands of revolutions per minute or more. Thus, the transmission 44 may gear down the axle speed of the motor 42, in order to drive the sprockets 36c, 36c and 36a at a proper and comparatively low number of revolutions per minute. In fact, usually less than a couple or three revolutions per minute should occur in the main sprocket 36a. The radius formed by the track 40 passing around the sprocket 36a and idler 38a defines how much progress (pi×diameter) in a longitudinal direction 11a the tractor 10 makes for each revolution of those rotating members 36a, 38a.

Figure 8:
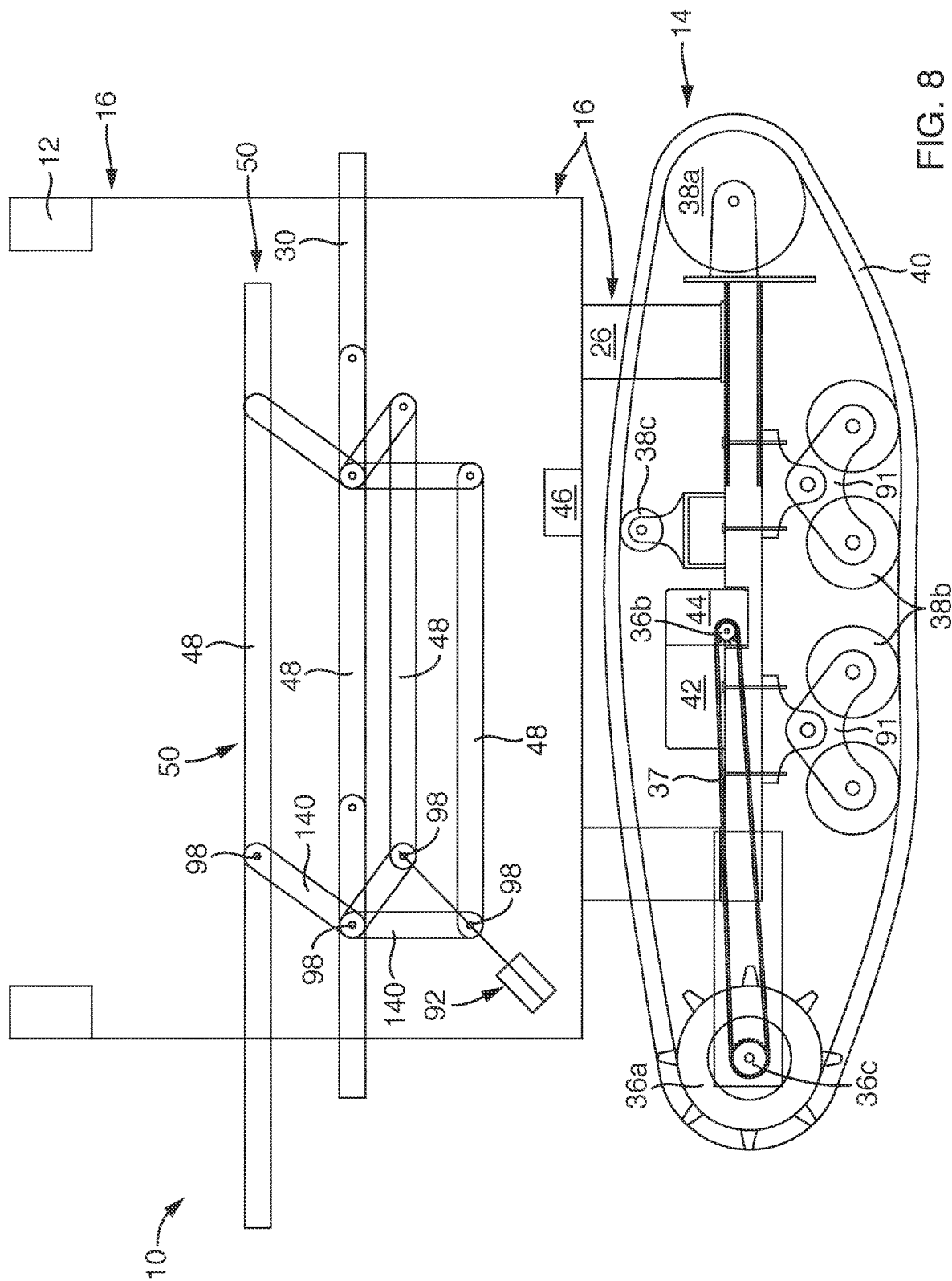
FIG. 8 is a side elevation view of the tractor of FIGS. 6 and 7.
Figure 9:
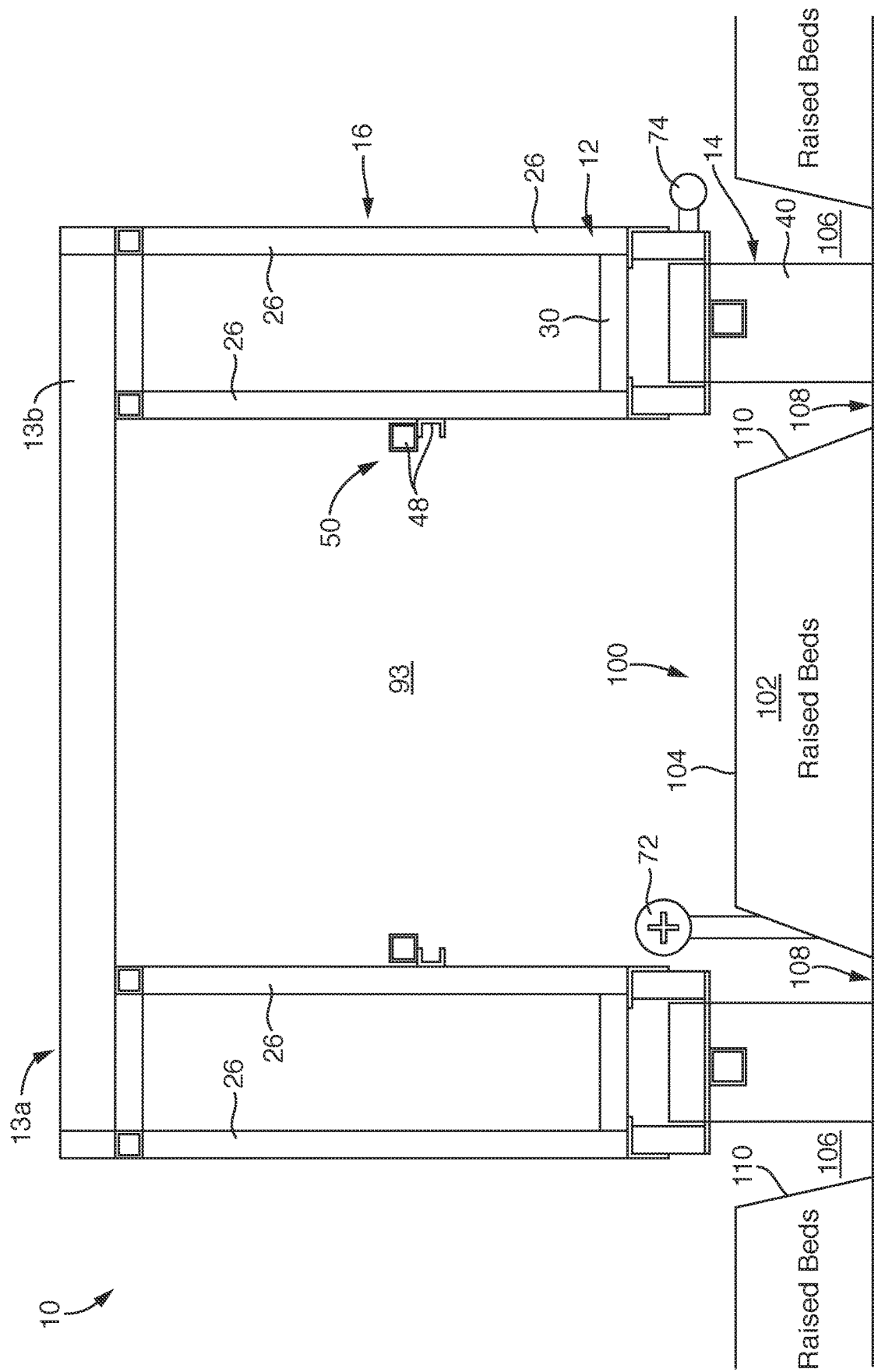
FIG. 9 is a front elevation view thereof in a farming plot.

Referring to FIGS. 8 and 9, while continuing to refer to FIGS. 3 through 9 and FIGS. 1 through 25 generally, a tractor 10 in accordance with the invention may include a superstructure 16 as a portion of the frame 12 above the drive system 14. The linkages 140 or links 140 pivoting about the pivots 98 and driven by the actuator 92 of whatever type (e.g., hydraulic cylinder, ball screw, chain, cable, winch, hand adjustment, crank, and so forth) may provide the implement carrier 50 with its necessary adjustments in elevation 11b.

Likewise, these components may accommodate a raised bed 102 or other row 102 in a plat 100 or plot 100 representing a field 100 of ground 100. In the illustrated embodiment, a raised bed 102 will have a bed surface 104 into which crops will be planted, to be cultivated and eventually harvested. Alternating with the bed surface 104 is a furrow 106 with its bottom surface 108 along which the track 40 of the tractor 10 will progress. Between the bed surface 104 of the bed 103 above the furrow 106 with its surface 108 is a side hill 110.

Part of the purpose of cultivation is to cut weeds on the side hill 110 and in the furrows 106, and to disrupt weed growth along the side hill 110. Sometimes needed is to add material from the surface 108 of the furrow 106 to the side hill 110 to bury weeds. Accordingly, the side hill 110 may be aerated, covered, disrupted, and rearranged by tillage implements 20 carried by the implement carrier 50 of the tractor 10.

Referring to FIG. 9, a target 72 is represented, standing for any and every type of target that may be used to guide a tractor 10 in accordance with the invention. In the illustrated embodiment, the target 72 is secured in the soil of a plot 100 being cultivated, and has a mark on it to provide an image that can be tracked, and centered on. A detector 70 may be mounted to any portion of the tractor 10 in accordance with the type and location of a target 72 to be detected.

In the illustrated embodiment, the target 72 may correspond to a furrow 106, while the detector 74 is positioned to detect the target 72 at a corresponding height. However, in view of the discussion hereinabove of different types of targets 72, sensors 74 or detectors 74, and their presentations on the user interface 80, or to the processors 76, 78, any one of a host of tracking and guidance systems 22 may be implemented.

The simplest may follow a line, the soil contour, or the like. Detectors such as probes may merely reach out to touch or "see" some portion of the ground 100. They may guide on the bed surface 104, the furrow 106, its bottom surface 108, or the side hill 110 in order to physically detect the presence of soil. The controller 46 may use that information to operate to control the speed of the tracks 40. Speed is the only parameter that is typically controlled dynamically (in operation) a track 40.

The angle of a track 40 between a roller 38b type of idler 38, and a sprocket 36a carrying the lower reach 40a of a track 40 may effect or even control the ability of a track 40 to climb an obstacle. In the embodiment of FIGS. 3 through 5, the diameter of the sprocket 36a and idler 38a determine the variable angle of incidence of the track 40 with respect to the soil 100. One can return to the technology of combat tanks, their ability to climb obstacles, in and out of ravines or ditches, and the like can be studied at length. All that technology need not impact the invention, but may be referred to as instructive for implementing certain conventional structures and modifications thereto for use in a tractor 10 in accordance with the invention.

Figure 10:
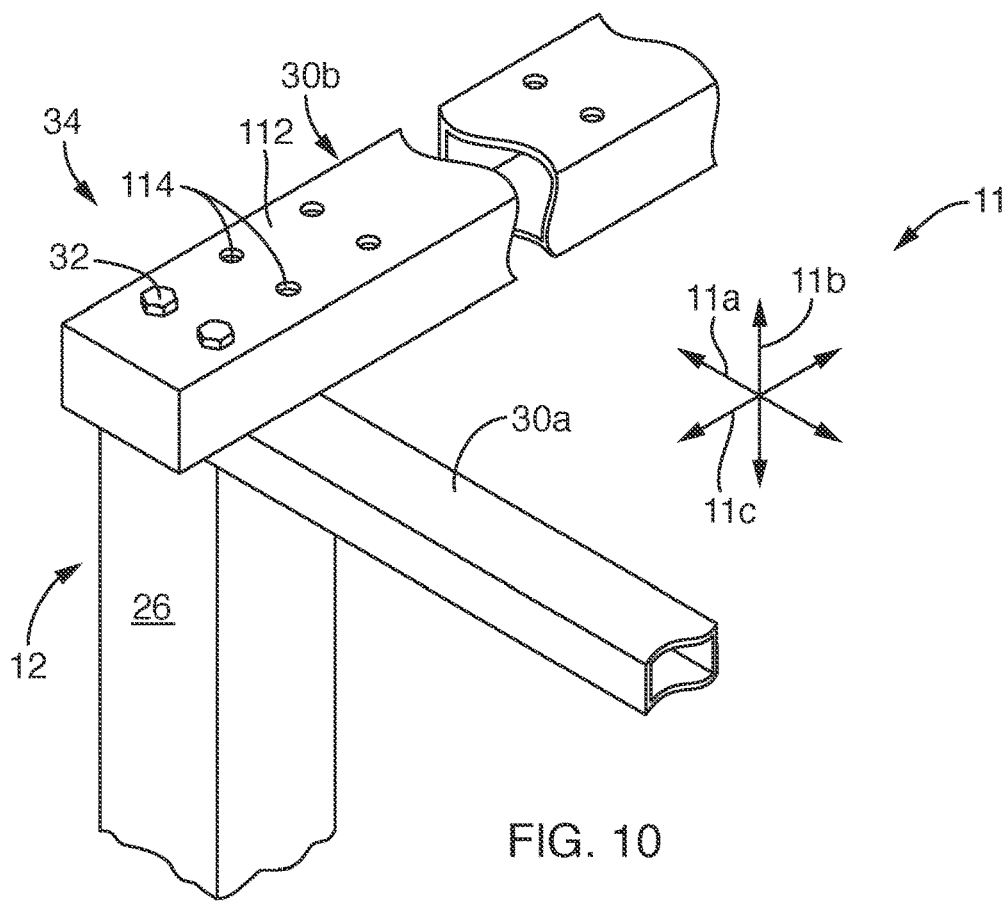
FIG. 10 is a perspective view of one embodiment of an adjustable beam for adjusting the width between the tracks and their associated power modules in a tractor in accordance with the invention.

Referring to FIG. 10, while continuing to refer generally to FIGS. 1 through 25, a beam 30b secured to a beam 30a extending in a longitudinal direction 11a provides for adjustability in a lateral direction 11c for a tractor 10 in accordance with the invention. For example, although both of the beams 30a, 30b extend in horizontal directions 11a, 11c, they are perpendicular (orthogonal) with respect to one another.

Similarly, a pillar 26 may be secured to a beam 30a, but need not connect directly to the cross beam 30b or lateral beam 30b. This is because the beam 30b should provide adjustability between corresponding longitudinal beams 30a in the two halves 13a, 13b of the tractor 10. In this particular embodiment, bolts 32 penetrate through apertures 114, of which may sets are available. Accordingly, the adjustable beam 112 or adjuster 34 constituted by the interaction between the beam 30b and the beam 30a provides a variable width in a lateral direction 11c for the tractor 10. The bolts 32 or fasteners 32 operate as securements 32 in three directions 11a including all three orthogonal directions 11a, 11b, 11c.

For example, threads on a bolt 32 or other securement 32 will provide securement in a vertical direction 11b of the beam 30b to the beam 30a. Typically, the frame 12 will be welded together as between the beam 30a and the pillar 26. By removal of the fasteners 32, one may lengthen or shorten the overall distance between the two halves 13a, 13b (tracks 40, drive systems 14, associated framing 12, and their supported superstructures 16, respectively.

Figure 11:
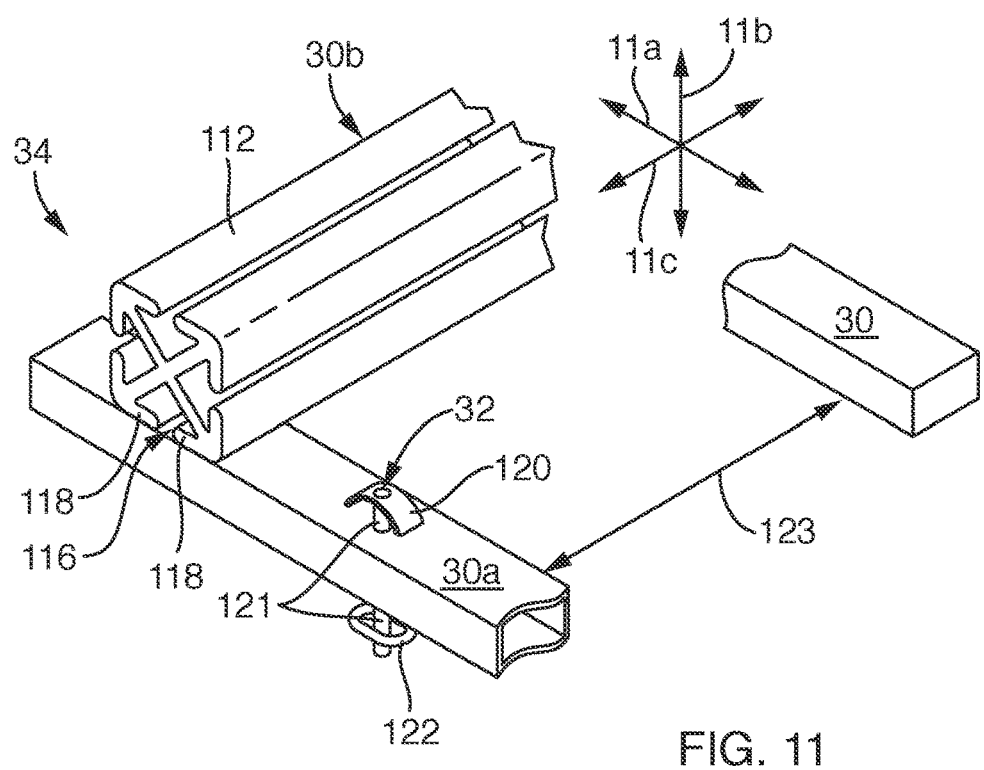
FIG. 11 is a perspective view of an alternative mechanism for an adjustable cross beam for a tractor in accordance with the invention.

Referring to FIG. 11, an alternative embodiment for a system 34 of adjustment or an adjuster 34 may involve an extruded beam 30b extending in a lateral direction 11c to engage the beam 30a extending in a longitudinal direction 11a. Meanwhile, the shape of the extruded beam 30b provides ways 116 or paths 116 circumscribed by resulting feet 118. Feet 118 are clamped by dogs 120 or clamps 120 operating as securements 32 or fasteners 32 of the beam 30b against the beam 30a.

In the illustrated embodiment, for example, a bolt 121 may receive a nut 122, or hand wheel 122 operating as a nut 122, to shorten and tighten the effective length of the bolt 121. This brings the dog 120 to bear or clamp with force against the feet 118 of the beam 30b. In this way, the extruded beam 30b may be adjusted to virtually any length with an infinite degree of variability as to the exact distance in a lateral direction 11c. The distance 123 between a corresponding beam 30 opposite the beam 30a lies between "mirror-image" equipment associated therewith.

Figure 12:
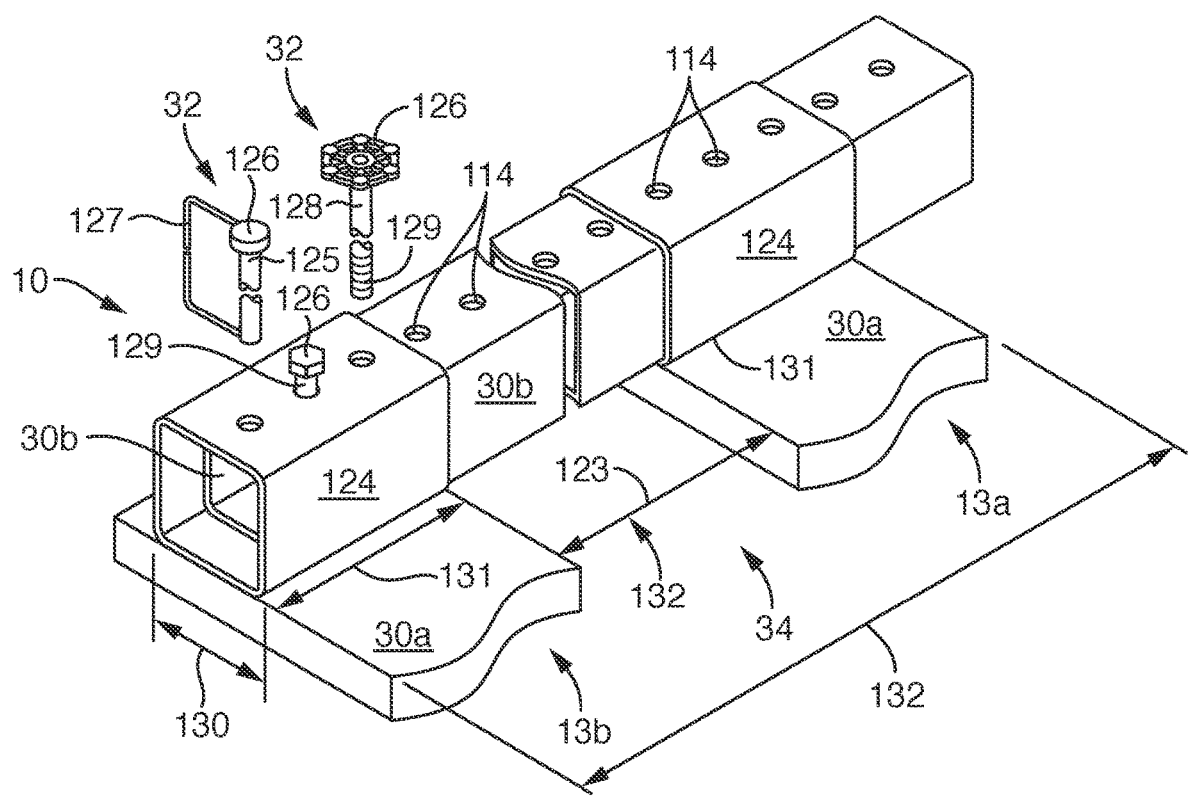
FIG. 12 is a perspective view of an alternative embodiment of an adjustable beam for adjusting the width of tracks in a tractor system in accordance with the invention.

Referring to FIG. 12, an adjuster 34 adjusting the distance 123, includes bearing links 124 on two halves 13a and 13b of the tractor 10. They (124) may be interconnected by a central cross beam 30b. A "break symbol" indicates an additional portion of the length 123 not illustrated, but simply replicating more of the beam 30b. Registering (aligning) apertures 114 in the receivers with those 114 in the beam 30b will adjust the distance 123 between the corresponding beams 30a of the halves 13a, 13b of the tractor 10.

In the illustrated embodiment, alternative securements 32 are used to illustrate a mechanism for providing suitable stiffness, strength, and bracing to maintain alignment of the two halves 13a, 13b. Typically, tractors have frames, of solid cast iron. In a fabrication 10 in accordance with the invention, receivers 124 may be secured by welding to their corresponding beams 30a.

The cross beam 30b may be secured into each of the receivers 124 by pins 125 having a head 126 for registration (positioning), alignment, stopping of the pin 125 in the apertures 114. Pins 125 may be secured by a keeper 127. On the other hand, a bolt 128 may be used in the receiver 124 and may operate as a pin 125. A bolt 128, having threads 129, is secured by a nut, threads in a framing member (e.g., 30a) or the like. In the illustrated embodiment of a bolt 128, a head 126 is formed to provide a handle such that the threads 128 may penetrate into threads corresponding thereto (not illustrated) down inside the beam 30a corresponding thereto.

The bearing length 130 in the longitudinal direction 11a may be selected to provide the proper stiffness and leverage between the beam 30b and the beam 30a in order to maintain alignment of the two halves 13a, 13b with one another. The bearing width 131 corresponding to the width of the beam 30a may be designed by selecting the overall width 131 on the beam 30a itself. For example, light weight is typically achieved by having comparatively small members spaced large distances (many diameters) away from one another.

Here, by diameter is simply meant effective diameter. An effective diameter is four times an area divided by its perimeter. Thus, one can compare a circular diameter to a rectangular or square diameter by such a formula. That is, effective diameter is four times the area of a cross section divided by its perimeter.

In this embodiment, the bearing length 132 is measured with respect to the overall inner, outer, or center-of-track dimensions of the tractor 10, the central dimensions of each of the halves 13a, 13b, or some point therebetween. One choice is the specific distance 123 between the beams 30a. Nevertheless, the important factor is to consider the leverage, meaning forces acting at a distance or a length between components. In general, a bearing distance 132 is a distance representing a maximum leverage distance on an object. Thus, the bearing length 130 and bearing width 131 area also bearing distances 132 supporting any load transfer in any direction including a turn (torque) or straight (compression or tension) loading across a boundary between the members 30, 124.

One reason for cross bracing 28 in structures is to provide more bearing distance 132 and stiffness with less weight. However, in order to maintain the open bay 93 between the halves 13a, 13b of the tractor 10, one may substitute larger bearing lengths 130 and bearing widths 131 instead of other braces 28b or gussets 28a (generally braces 28). For example, with welding, it is possible to provide a very secure connection between each beams 30a and its corresponding receiver 124.

As in FIGS. 10 and 11, comparatively small fasteners 32 or securements 32 may be relied upon, binding two components together. The effective bearing lengths 130 and bearing widths 131 may be substantially larger, effectively being associated with the contact areas and the maximum extent of those contact areas between corresponding beams 30a, 30b.

Figure 13:
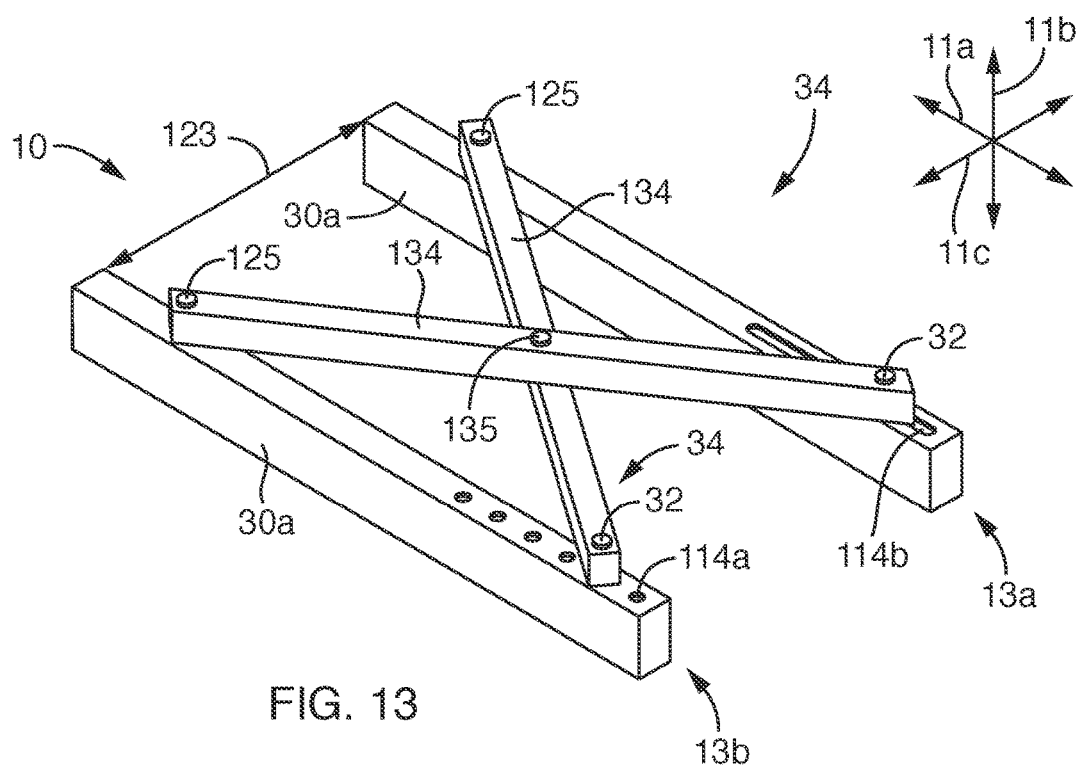
FIG. 13 is a perspective view of an alternative embodiment of a cross beam adjustment mechanism, involving angular bracing (diagonals) in two alternatives, one with discrete positioning of the cross beams, and another with continuously slidable and fixable adjustment of the cross beams.

Referring to FIG. 13, an alternative embodiment of an adjuster 34 is shown with two alternative fastening mechanisms. For example, in this embodiment the cross beam 30b is replaced by diagonal beams 134 pivoting at a central pivot 135 securing them to one another. Thus, any spacing apart of the ends of the cross beams 134 at their pins 125 will be matched by a separation of the securements 32 at the opposite ends thereof. On the half 13a of the tractor 10, the apertures 114a are changed on the other half 13b from discrete apertures 114a to a long, single, continuous aperture 114b. Thus, the pins 32 or securements 32 may only be positioned at specific locations 114a. These discrete apertures 114a or locations 114a may be positioned in a manner that will result in, for example, a specific distance of separation 123 between the beams 30a at a standard increment, such as two inches, or some other multiple of distance.

Meanwhile, the continuous slot 114b or slot aperture 114b will receive a securement 32. That fastener 32 must fix itself in the longitudinal direction 11a. This is required to maintain a specific distance 123 between the beams 30a in the direction 11c or lateral direction 11c.

Figure 14:
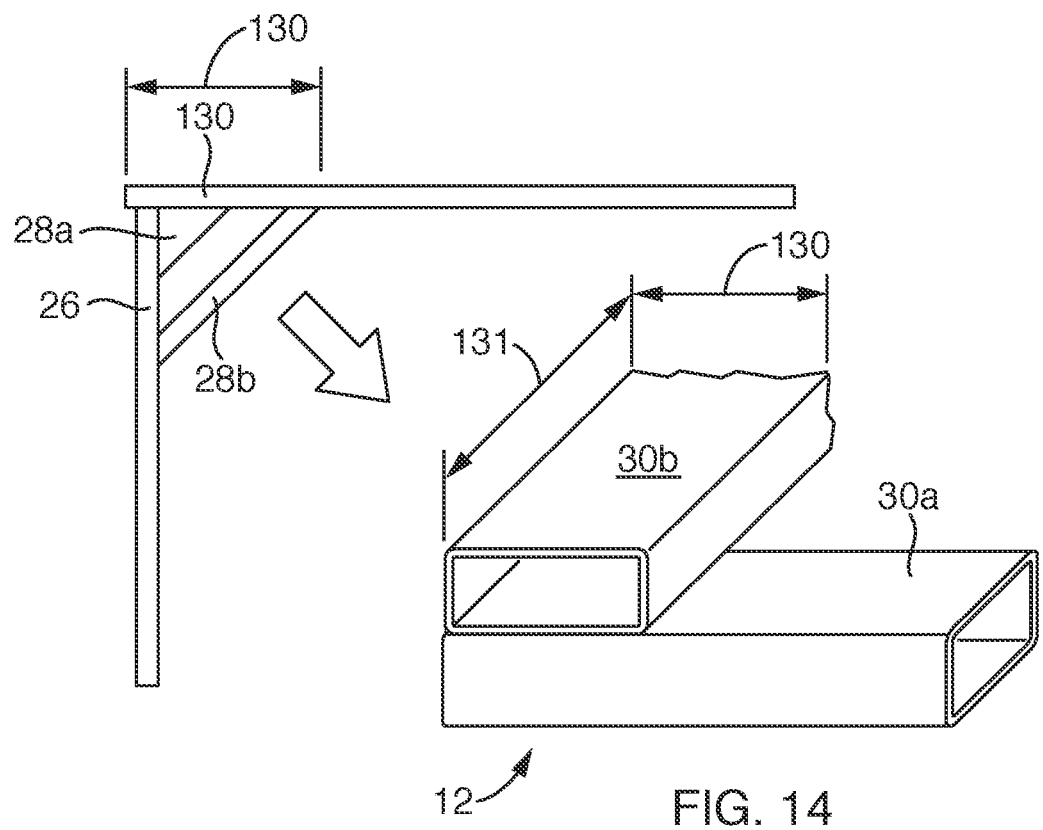
FIG. 14 is an perspective view of a beam connection illustrating the significance of bearing length and bearing width as a bracing mechanism in addition to the concept of gussets 28a or struts 28b (angle braces 28b)

Referring to FIG. 14, the concept of bearing length 130 and bearing width 131 is illustrated. For example, in this embodiment, a theoretical beam 30a in the longitudinal direction 11a is juxtaposed and secured to a beam 30b extending in a lateral direction 11c. Conventionally, beams 30 and pillars 26 may be connected by gussets 28a or struts 28b. A strut 28b just as a gusset 28a (where a gusset is a solid plate, and a strut 28b is a beam of some type), increases the bearing length 130 along the beam 30. It is defined by the extreme distance 130 away from the pillar 26 at which the gusset 28a or strut 28b connects.

Clearly, two beams 30a, 30b may be substituted for the beam 30 and pillar 26 when dealing with a completely horizontal (longitudinal 11a and lateral 11c) planar extent of a portion of a frame 12. One can see that increasing the size of the beam 30 and pillar 26 or two beams 30 in a horizontal plane, one can obtain the same bearing distance 130 between the beams 30a, 30b by simply making those beams 30a, 30b wider, deeper, longer, and so forth. Necessarily, this will affect the weight. However, the same stiffness may be obtained in the frame 12 by sacrificing a certain degree of lightness or taking a weight penalty. In a tractor 10, this may be very acceptable in order to obtain the bearing distances 130, 131 desired.

Figure 15:
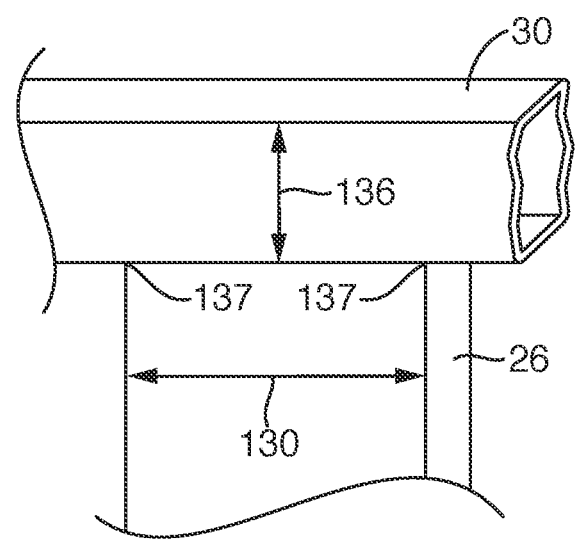
FIG. 15 is a partially cut away, perspective view of a joint between a beam and a pillar of the frame illustrating the significance of beam depth and bearing length.

Referring to FIG. 15, a pillar 26 is connected to a beam 30 having a beam depth 136. The bearing length 130 is defined between the corners 137 of maximum distance across the pillar 26. This bearing distance 130 may be equivalent to what could be achieved or what may otherwise be achieved by gussets 28a or struts 28b, just as described with respect to FIG. 14.

Figure 16:
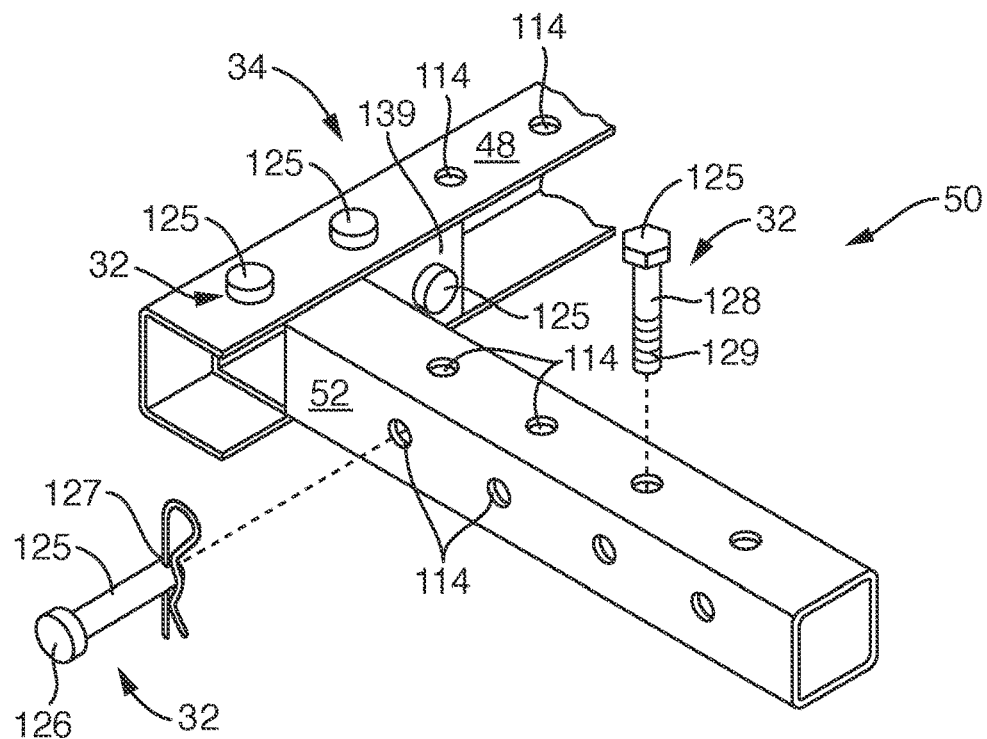
FIG. 16 is a perspective view of one embodiment of a tool bar and its selective positioning and securement in an implement carrier on a tractor in accordance with the invention and illustrating various fastening mechanisms for implements or tools on a tool bar.

Referring to FIG. 16, one embodiment is illustrated for a mechanism to connect the implement carrier 50 to a tool bar 52. In this embodiment, one or more pins 32 or securements 32 may form an adjuster 34 by fitting the tool carrier 52 at different locations through apertures 114 distributed along the rack 48. In this illustration, the rack 48 may operate like a channel iron member having a channel cross section, or as a closed tube. The tool bar 52 may be provided with clamps or its own apertures 114 for receiving a clamp, a tool, or the like.

Fasteners 32 secure the tool bar 52 at a location along the rack 48. A rack 48, relies on various positions of apertures 114 for receiving the fasteners 32. The bolts 125 or pins 125 may extend vertically 11b, horizontally 11c, or both. For example, although not necessary, pins 125 may also be positioned to extend through the foot 139 of the tool bar 52. The foot 139 is shown as a weldment secured to the tool carrier 52 or tool bar 52. Certain implements 20 may have multiple tool bars 52 in order to adapt them to fit the particular rack 48.

As a practical matter, a rack 48 may also be tubular, and the foot 139 of the tool bar 52 may itself have a C-shape or channel shape fitting around the rack 48. These design choices are a matter of structural integrity, strength, stress, and their suitability for operation of a tractor 10 in accordance with the invention.

Figure 17:
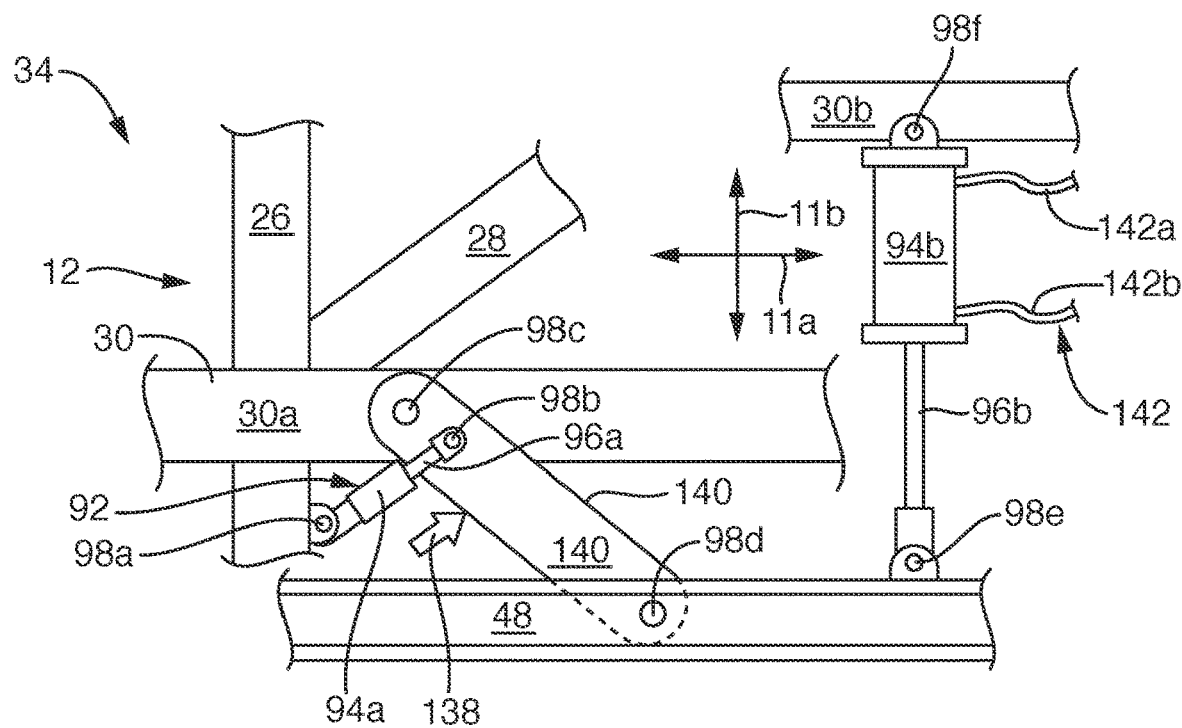
FIG. 17 is a side elevation view of one embodiment of an adjustment mechanism illustrating two alternative embodiments for elevating and descending the implement carrier or support type of rack on a tractor in accordance with the invention.

Referring to FIG. 17, while continuing to refer generally to FIGS. 1 through 25, an adjustment system 34 or simply an adjuster 34, may secure a link 140 to a frame 12. Typically, the link 140 will be secured by a pivot 98c at a fixed location with respect to the frame 12, while the other end of the link 140 will be pivotably secured to a rack 48 by another pivot 98d. An actuator 92 may be pivotably secured by a pivot 98a and extend away therefrom to a pivot 98b on the link 140. This provides a triangulation formed by the frame 12 as one rigid body, the portion of the link 140 between the pivots 98b and 98c as another rigid body, and the actuator 92 extending between the pivots 98a and 98b as a body that is selectively rigid.

For example, the actuator 92 is a movable member 92 or an extensible member 92. However, by extension of the shaft 96a out of the hydraulic cylinder 94a, a force 138 is exerted on the link 140. Thus, the triangle formed by the pivots 98a, 98b, 98c is adjustable to be fixed at any particular location, but selectively fixed at any particular location desired.

One will note that the pivot 98b may be positioned anywhere along the lengths of the link 140, including outside of the distance between the pivots 98c and 98d. For example, the illustration shows by example that the distance between the pivot 98b and the pivot 98c is comparatively short, providing a leveraged disadvantage. It therefore provides a distance multiplication in the pivot 98d as it scribes an arc of motion about the pivot 98c fixed with respect to the frame 12. In the illustration, a beam 30a is secured fixedly to a pillar 26 and stabilized by a stiffener 28 stabilizes a corner. The corner is formed by the pillar 26 and the beam 30a and may be considered a rigid body.

Alternatively, the rack 48 forms a part of an overall implement carrier 50 to support a tool bar 52 adjustably carrying one or more implements 20. It would not necessarily have the same range of motion as that provided by the pivoting link 140. In other words, the hydraulic cylinder 94b is driven to extend the shaft 96b when oil is received through a line 142a. It may be reversed to lift the shaft 96b and rack 48 by way of the pivot 98e upon receipt of hydraulic oil (or pneumatic actuation) through the line 142b. Typically, a hydraulic cylinder 94b must pivot on both ends, and be free to align on at least one end. Thus the pivots 98d and 98f. Only the direct motion of a shaft 96b is available to position the rack 48 in such an embodiment, shown here as an alternative.

In contrast, the leverage of force and distance (operating reciprocally universally with respect to one another) may permit a comparatively smaller stroke of a shaft 96a to operate through the pivot 98b on the link 140. The link 140, pivoting about the pivot 98c may then sweep the pivot 98d in a comparatively large arc. The arc stands relative to the comparatively smaller arc that would be scribed by the pivot 98b. Thus, the configuration with the link 140 and hydraulic cylinder 94a may literally swing the pivot 98d and its pivotably connected rack 48 through a much larger distance in the vertical direction 11b, as compared with the shaft 96b operating out of the hydraulic cylinder 94b.

Figure 18:
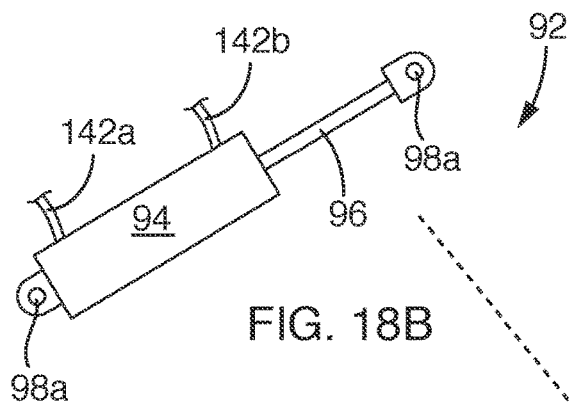
Figure 18:
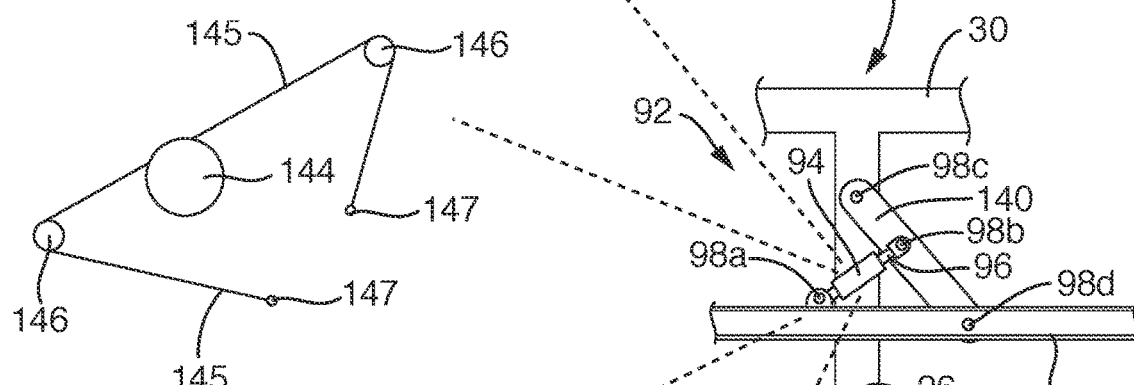
Figure 18:
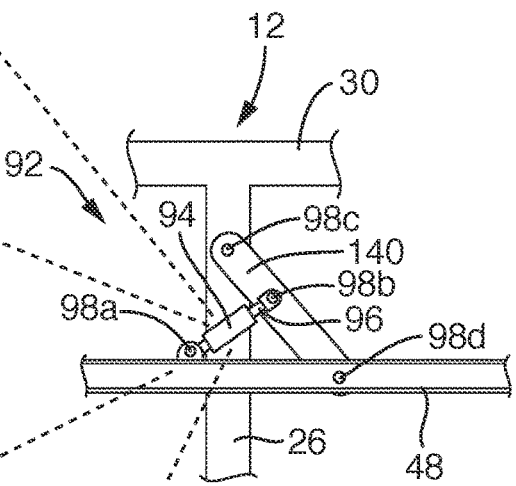
Figure 18:
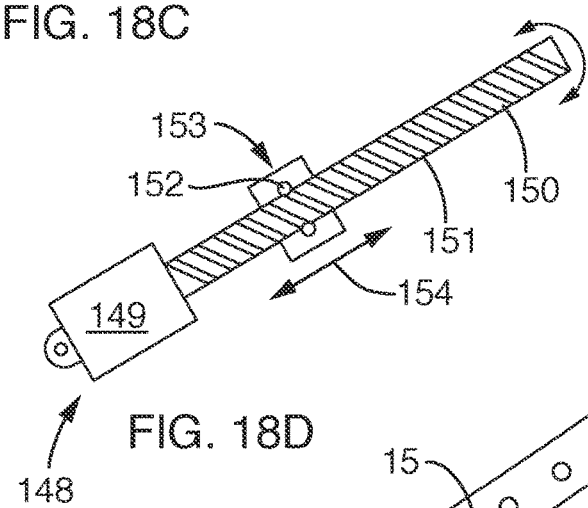
Figure 18:
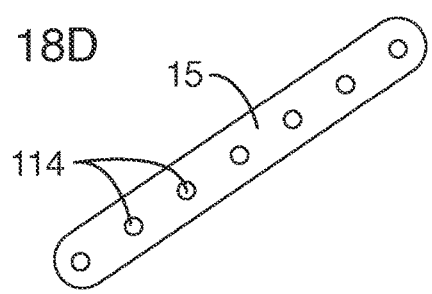
Figure 18:
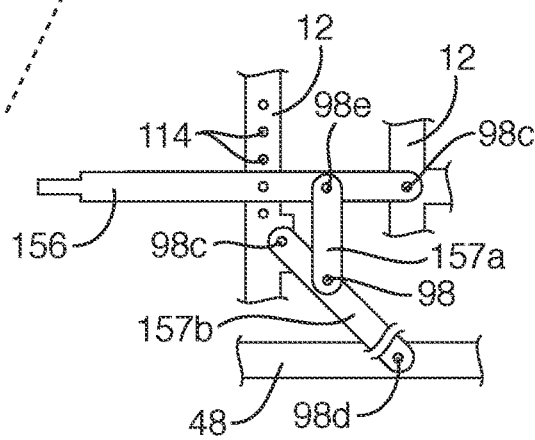

Referring to FIG. 18, while continuing to refer generally to FIGS. 1 through 25, various types of actuators 92 are illustrated. For example, in the image of FIG. 18A, corresponding to FIG. 17, the actuator 92 may be implemented or effected in one of several ways. For example, FIG. 18B illustrates a hydraulic cylinder operable as an actuator 92.

Referring to FIG. 18C, a winch 144 may be configured as a drum 144 paying out or simply frictionally engaging a loop of a flexible cable 145, chain 145, strap 145, or the like. The flexible link 145 may be any "single-force member," meaning that the flexible link will support a force only in tension, not in compression, and not perpendicular to the path thereof. For example, the ends 147 of the flexible link 145 may be connected to one or more members in order to enable the winch 144 or drum 144 to draw the link 145 around the pulleys 146 in either direction. Thus, the winch 144 may rotate clockwise to lower the positions of the ends 147, or may rotate counter clockwise to elevate the ends 147.

Referring to FIG. 18D, in contrast is a mechanism known as a ball screw 148. A motor 149 or drive 149 rotates a screw 150. The screw 150 is threaded with threads 151, shaped to receive ball bearings 152. The ball bearings 152 travel in a race 153 or bearing race 153 operating as a nut 153 traversing the length of the shaft 150 or screw 150 with minimal friction. Thus, speed and power are available. Accordingly, a rotation clockwise in the illustration, with the drive system 149 (e.g., motor, motor and transmission, etc.) provides axial motion of the nut 153. The drive assembly 149 may be fixed pivotably to a frame 12 while the nut 153 is pivotably secured to a movable member, such as a link 140.

Clockwise motion of the screw 150 threads into the nut 153. The nut which is the only member of the ball screw 148 that can actually move axially with respect to the screw 150. Counter clockwise motion moves the nut 153 riding on the screw shaft 150 away from the drive system 149. The ball bearings 152 provide for an extreme reduction of friction between the screw 150 and the nut 153.

Referring to FIG. 18E, in certain embodiments, given the comparatively small size and reduced weight (size being on the order of a few feet long and a few feet high plus a few feet wide), the overall size and weight of a tractor 10 may actually be suitable for manual operation of a link 155, which is adjustable, yet always fixed during operation. In such an embodiment, the pivots 98a, 98b are simply replaced by pins through apertures 114 in the link 155, thus providing no dynamic adjustment of the positioning of the link 140, but rather being adjustable between operations by lifting or dropping the link 140 to position the rack 48. The rack 48 is fixed by pinning the link 155 between the pivot points 98a and 98b at selectively fixed positions. With lighter implements weighing less than one hundred pounds, a link 155 is a practical and simple solution to adjustability of the height of the rack 48 carrying an implement 20.

Referring to FIG. 18F, an additional leverage advantage may be provided by using a lever 156 connected by links 157a, 157b to lift a rack 48. In this embodiment, the lever relies on a pivot point 98c on a frame 12. An intervening link 157a lifts the link 157b to lift the rack 48 about a pivot 98d. Meanwhile, the link 157b, just as the link 140 of FIGS. 17 and 18A, pivots about a pivot point 98c in a fixed location with respect to the frame 12.

The lever 156 may simply be pinned to apertures 114 selectively. This provides a lever 156 as a manual actuator 156 to lift a rack 48. Relative distances provide a suitable leverage advantage with respect to the user. Thus, much greater weight on the rack 48 may be lifted by a user depending on the handle 156 and its comparative length between the pivot 98c and a pivot 98e.

Figure 19:
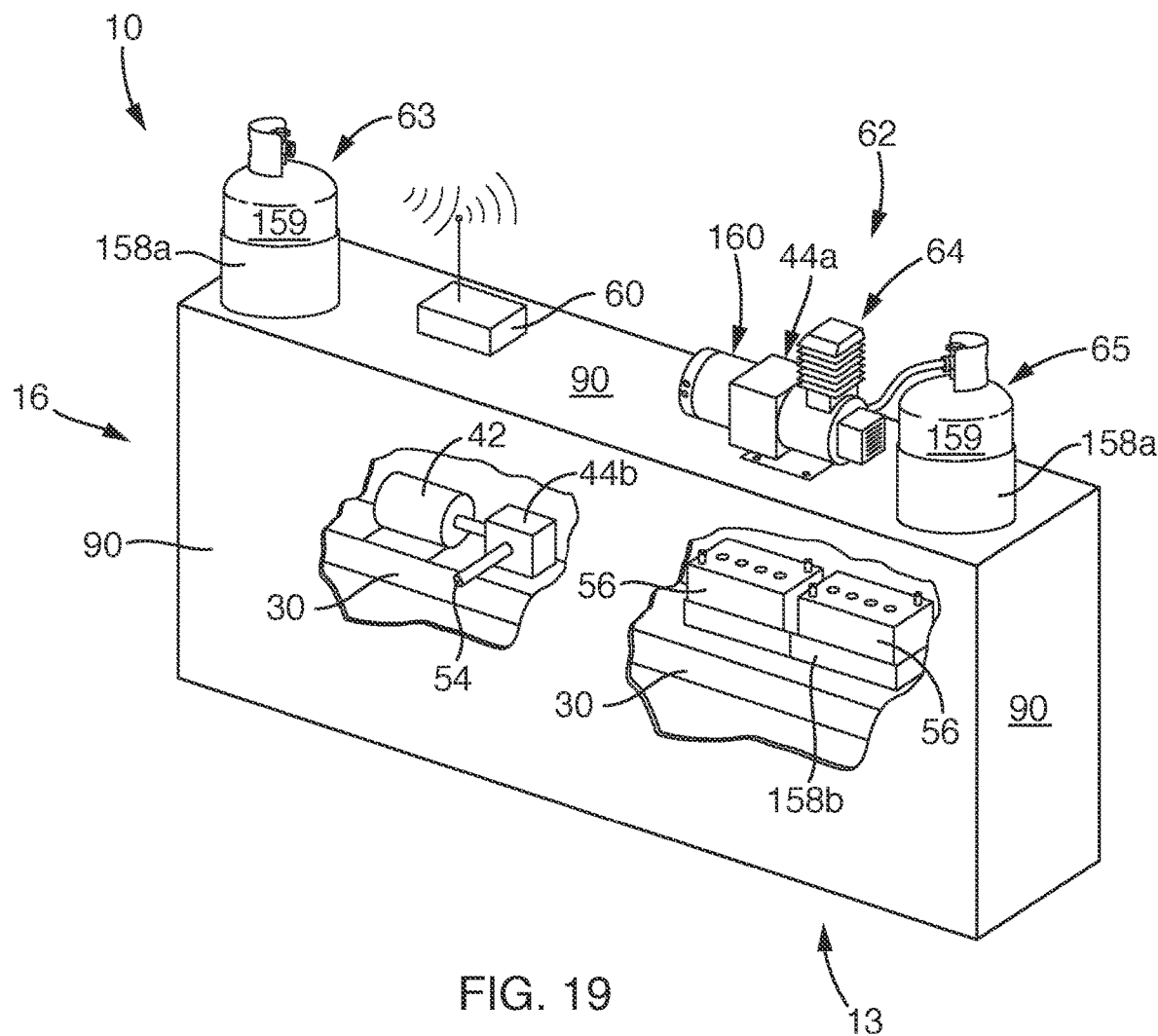
FIG. 19 is a partially cut away view of the superstructure of one embodiment of a tractor in accordance with the invention illustrating a possible positioning of a power takeoff, positioning of main power batteries or electric motors driving the tracks, a communication device, fuel for powering implements, as well as a potential hybrid motor and generator system for powering batteries for extended periods of time or for providing electrical power to implements, with its supporting fuel tank secured to the superstructure of a tractor in accordance with the invention.

Referring to FIG. 19, while continuing to refer generally to FIGS. 1 through 25, various components may be mounted within the superstructure 16 on either or both sides or halves 13a, 13b referred to generically here as a half 13. Thus, a half 13 may be a left half 13a or a right half 13b of a tractor 10 in accordance with the invention.

A beam 30 or even a pillar 26 of a frame 12 may have mounted thereto trays 158a, 158b for securing particular components. For example, tanks 159 securing, for example, auxiliary fuel 63 and hybrid engine fuel 65 may be mounted in the open air on top of the shields 90 or covers 90. That is, if liquid propane operates as a fuel 63, then enclosure is prohibited for reasons of safety. Thus, allowing any leakage to freely escape into the open air is considered standard practice with liquefied petroleum gas (LPG) systems. Thus, the racks 158a may be positioned in the open air on top of the covers 90 and shields 90 surrounding the frame 30 of the tractor 10.

Meanwhile, the auxiliary fuel 63 may be fed through suitable lines to an implement 20, such as a flame weeder device that relies on a flame to scorch and thereby destroy weeds. On the other hand, an auxiliary power supply 62 in a hybridized power system may rely on a motor 64 or engine 64 operating on the fuel store 65 to drive a generator 160 recharging batteries 56. In the illustrated embodiment, the batteries 56 may be electrically connected in any suitable manner, controlled and regulated as per good electrical practice. They may be recharged comparatively continuously by the generator 160. In this way, the electrical system may operate from an engine 64 operating continuously or periodically in a nearer to optimal condition. The generator 160 connected through a transmission 44a (as needed or not) may drive the generator 160 at a proper speed to recharge the batteries 56.

A power takeoff 54 may actually operate on a motor 42 of any suitable type, including electric motor, possibly moderated by a transmission 44b or gear box 44b of some type. A power takeoff 54 may extend through a wall of a shield 90 in order to be accessible to an implement 20 carried by the implement carrier 50, and specifically supported by the adjustable rack 48.

In alternative embodiments, electrical power may be provided from the batteries 56, through a set of electrical cables to an implement to a motor 42 actually located on an implement carrier 50 or an implement interface 18. That is, a rack 48 as part of an implement carrier 50 may include various interface framing 18 necessary to physically and mechanically connect between the rack 48 and an implement 20.

Thus, electrical cables passing from the batteries 56 out to the implement 20 may carry electrical power from the batteries 56 to run a power takeoff 54 that is completely contained within the interface frame 18 to meet the rotary power needs of a specific implement 20.

Referring to FIG. 20, diagonal braces 28 may be used to stiffen or add additional strength and rigidity to the frame 12. As a practical matter, the specific angles, shapes, and positions of such angle braces 28 will be a matter of engineering calculation. As per the discussion hereinabove regarding bearing lengths 130 and bearing widths 131, strut-type braces 28 may be used.

Figure 20A:
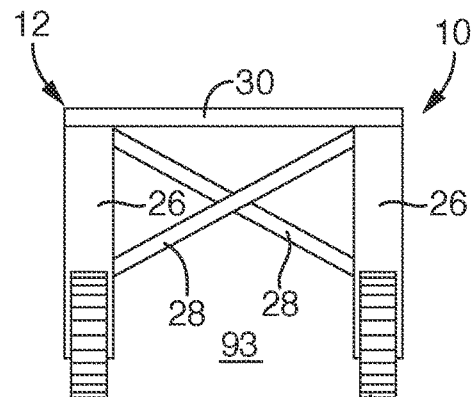
FIG. 20A is a front end elevation view thereof.
Figure 20B:
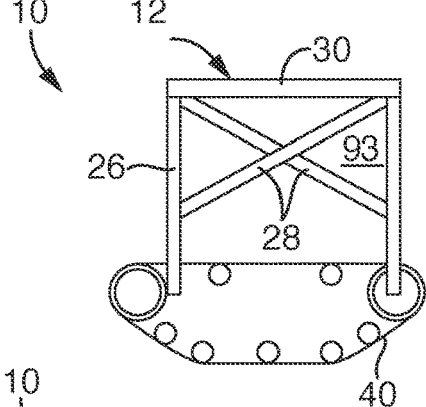
FIG. 20B is a side elevation view thereof.

For example, FIG. 20A shows diagonal bracing 28 in a front elevation view, and extending rather intrusively into the open bay 93. FIG. 20B shows a side elevation view of diagonal bracing 28 that may extend in a longitudinal direction 11a and a vertical direction 11b. FIG. 20c illustrates how diagonal bracing 28 may extend in a top plan view in a longitudinal direction 11a and a lateral direction 11c. Similarly, a bottom plan view of FIG. 20D illustrates diagonal bracing 28 that may exist, as in FIG. 20C in a horizontal plane formed by in longitudinal direction 11a and the lateral direction 11c.

Figure 20E:
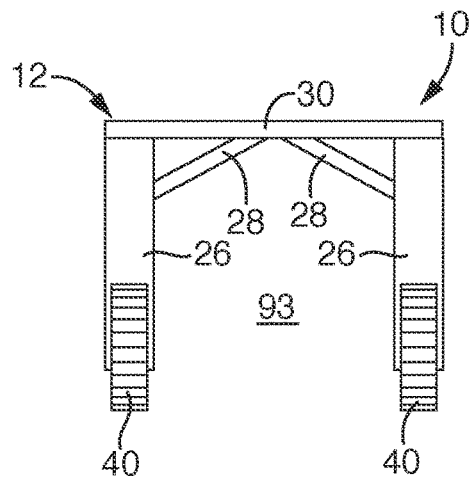
FIG. 20E is a front end elevation view in an alternative bracing arrangement.
Figure 20C:
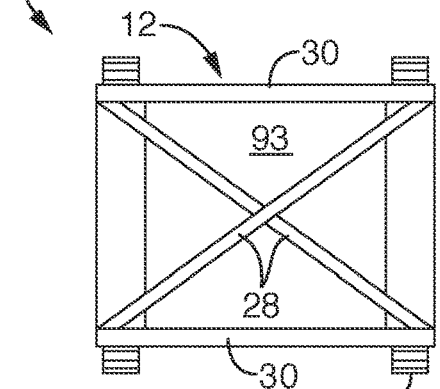
FIG. 20C is a top plan view thereof.
Figure 20F:
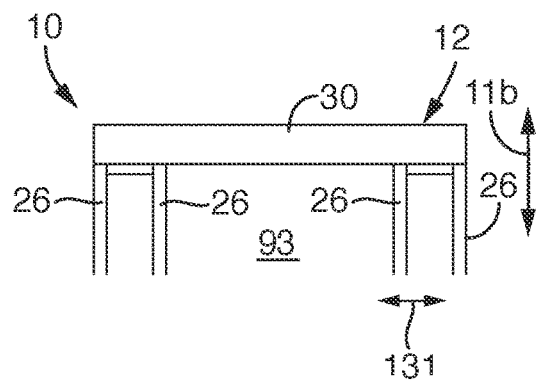
FIG. 20F is an end elevation view of top corners wherein the bearing distances of securement of beams and pillars substitutes for any angled or diagonal bracing.
Figure 20D:
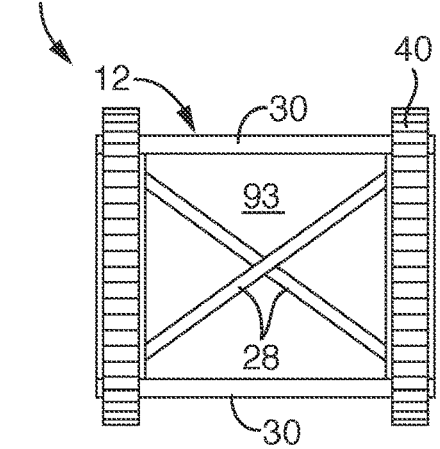
FIG. 20D is a bottom plan view thereof.
Figure 21:
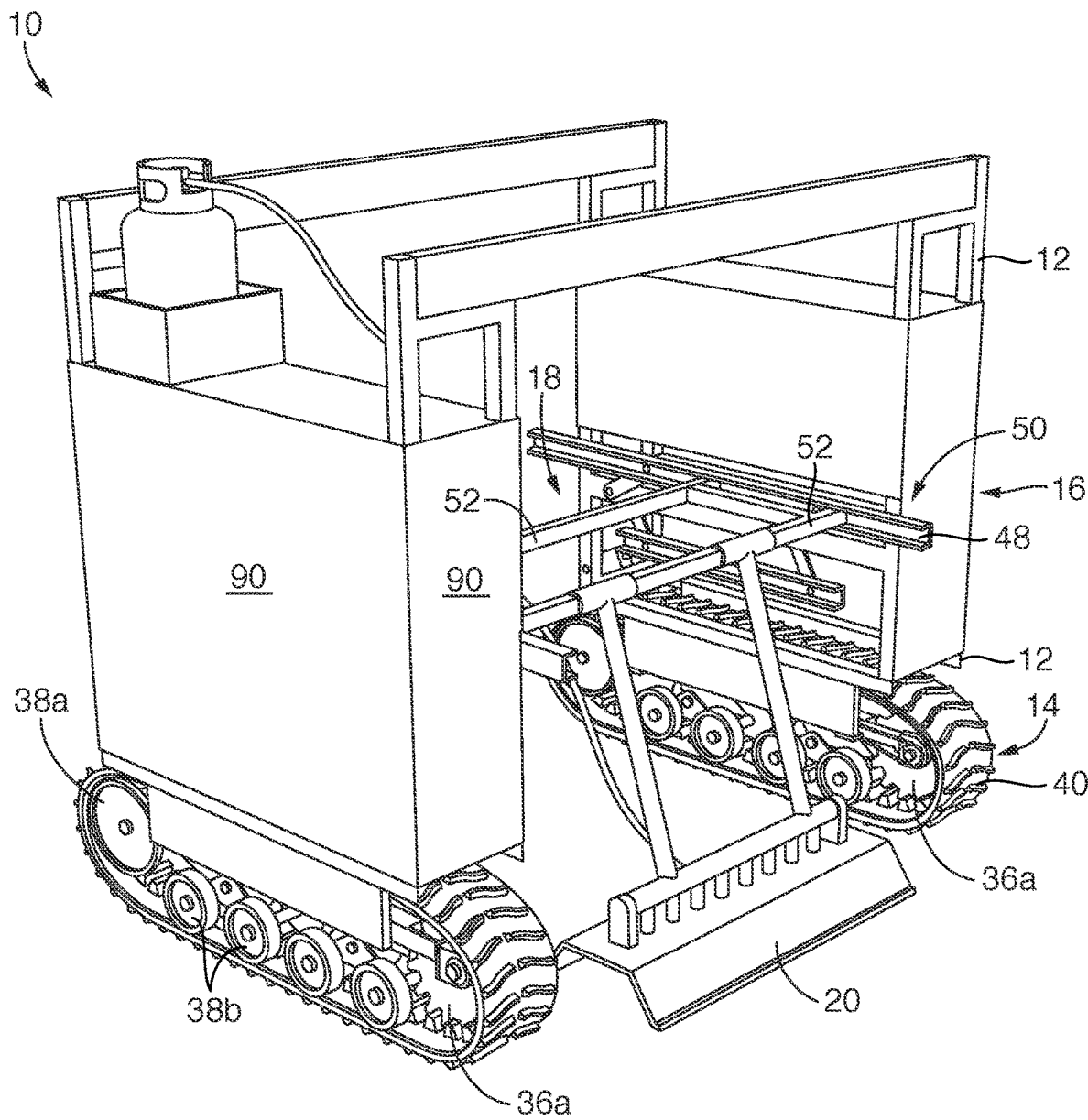
FIG. 21 is a frontal perspective view of a tractor in accordance with the invention carrying a flame weeder.

Referring to FIG. 20E, as per the discussions hereinabove regarding bearing distances, diagonal bracing 28 in this end elevation view may be comparatively short, high, and unobtrusive within the open bay 93. In fact, FIG. 20F shows a partial assembly of a beam 30 connected to multiple pillars 26 in such a way as to maximize the depth of the beam 30 and the vertical direction 11b while also increasing to a desired or necessary value a bearing distance 131 of the beam 30 on the pillars 26. Thus, rather than cross braces 28 or diagonal braces 28, the sizes and bearing distances 130, 131 may be selected for securement of the pillars 26 to the beams 30 in the frame 12.

Referring to FIGS. 21 through 25, while continuing to refer generally to FIGS. 1 through 25, a flame weeder 20 may be secured to a tool bar 52, or multiple tool bars 52 forming an interface frame 18 secured to the adjustable rack 48, of the implement carrier 50 of the tractor 10.

Figure 22:
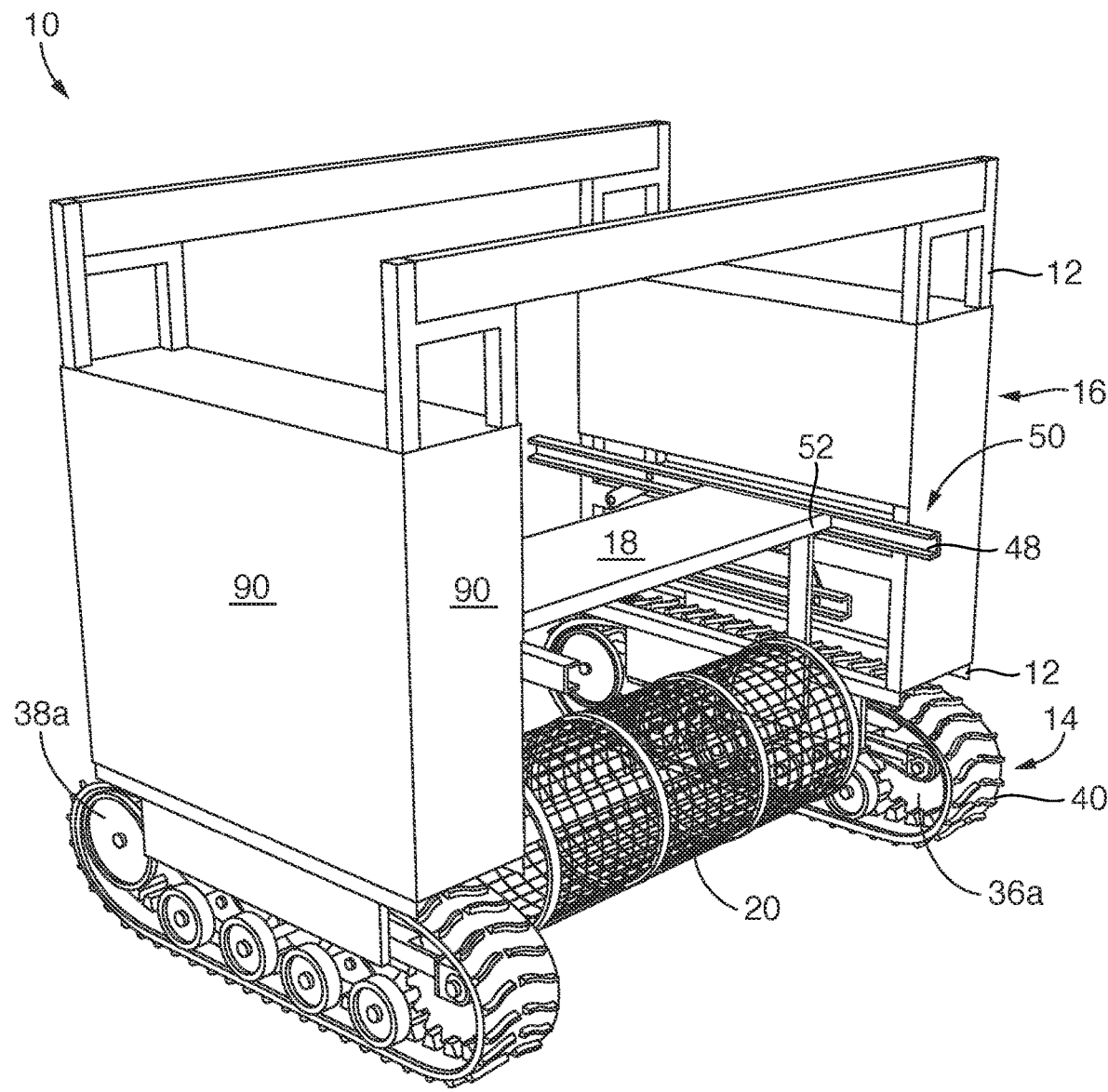
FIG. 22 is a frontal perspective view of a tractor in accordance with the invention carrying a roller such as may be used as a firmer or packing mechanisms for covering seed after planting and compacting slightly the soil around the seeds to assure germination.

Referring to FIG. 22, in similar fashion, an implement 20 configured as a roller 20 suitable for disturbing and slightly compacting a bed surface 104 may be configured to roll along the bed surface 104 to slightly compact and prepare for germination, seeds that have been sown in a particular bed 102 or row 102.

Figure 23:
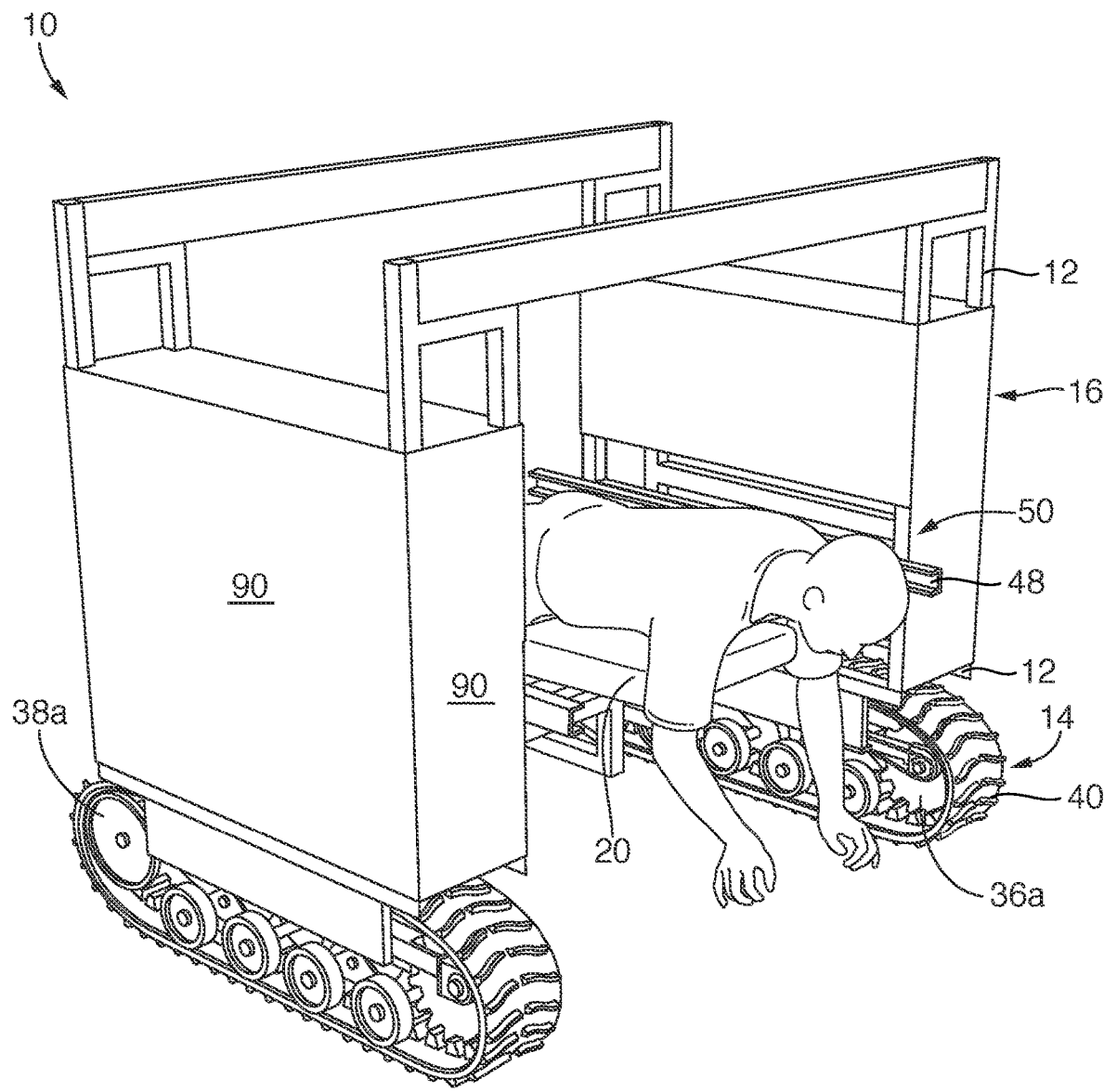
FIG. 23 is a frontal perspective view of a tractor in accordance with the invention carrying a prone deck for facilitating hand work within a plant bed by a user in a prone position, moved by the tractor.

Referring to FIG. 23, an implement 20 may be configured as a prone deck 20 supporting a prone operator or user. This is useful to do hand weeding, thinning, or close observation and attention to individual plants within a bed 102 or row 102.

Figure 24:
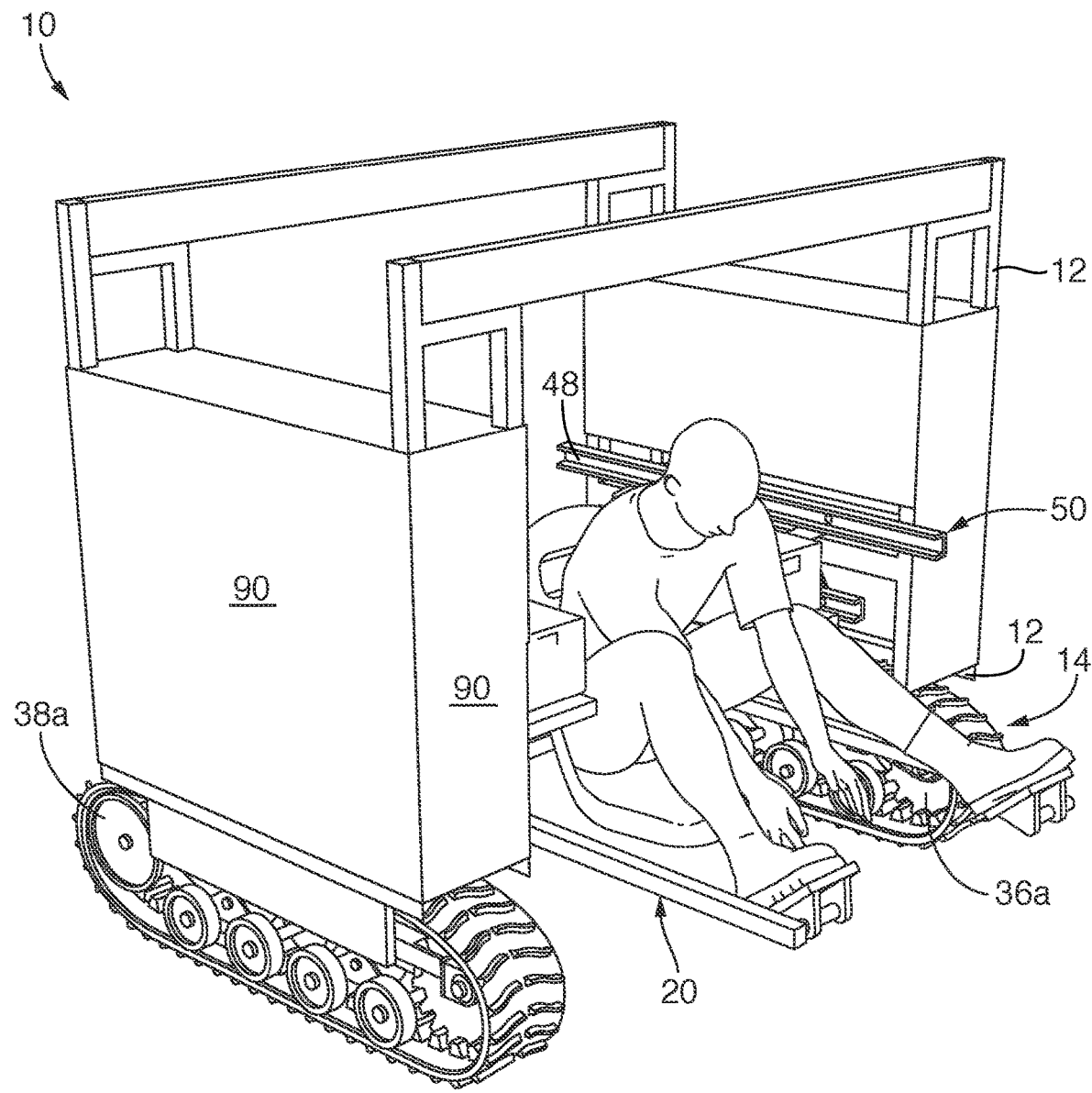
FIG. 24 is a frontal perspective view of a tractor in accordance with the invention carrying a seat as an implement in order to facilitate hand work in a plant bed, such as harvesting of "truck crops.

Referring to FIG. 24, in similar fashion, a seated user may rely on an implement 20 configured as a seat 20 with suitable supports secured to the rack 48. For example, in a harvesting operation, a user may be carried in a comfortable position to select and harvest plants from a growing bed 102 without continual kneeling, bending, and the like. Such motions that might otherwise be required for a careful, manual harvesting process. In intensive farming operations or intensive vegetable gardening operations, positions corresponding to the implements 20 in FIGS. 23 and 24 may be capable of greatly increasing productivity of an operator.

Figure 25:
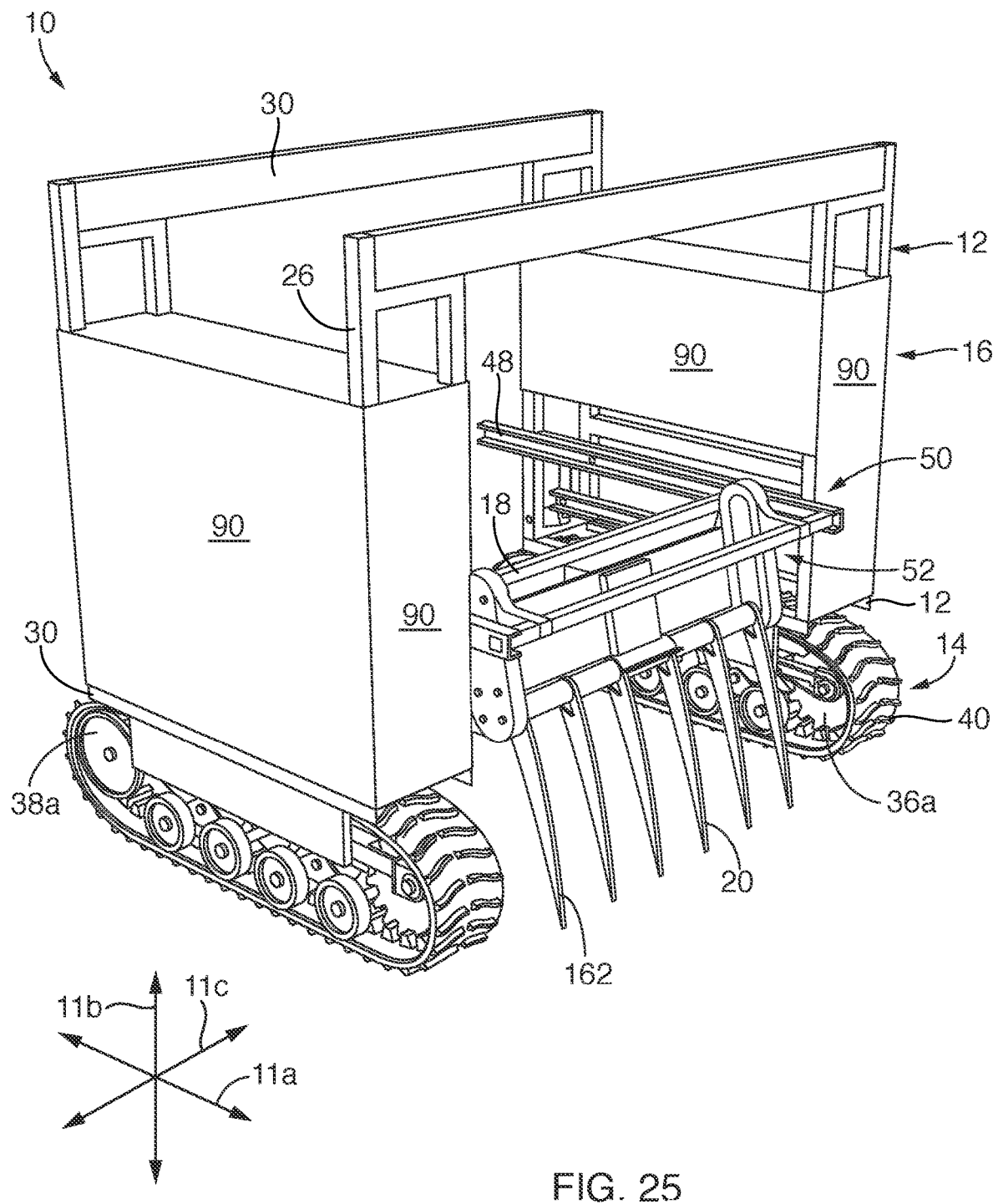
" and FIG. 25 is a frontal perspective view of a tractor in accordance with the invention wherein the implement carried is a broad fork suitable for tillage with minimum power and maximum leverage by the tool against the soil being worked.

Referring to FIG. 25, tillage may occur without rotary motion of conventional tilling tines and the like. For example, a great fork 20 is an implement 20 that may be secured by an interface frame 18 to the rack 48. As part of an implement carrier 50 one may adjust the tines 162 to point out ahead of the movement of the tractor 10. Tines 162 contact the bed surface 104 of a growing bed 102, and penetrate that bed surface 104. As the tines 162 pivot about the interface frame 18, they are driven into the ground by the weight of the tractor 10. Then they pivot and dig up part of the bed 102 as the orientation of the tines moves from forward to backward in rotation in response to the linear movement of the tractor 10 in a longitudinal direction 11a. Thus, without rotary motion, the tines 162 may pivot in the plane of the longitudinal direction 11a and the vertical direction 11b, thereby digging and lifting soil in the bed 102 for tillage.

The toolbar (carrier) mechanism may be implemented in various configurations, typically adjustable in height and width. Bracketing may be done in any suitable manner. Motors 42 may be mounted by direct drive to sprockets 361, or by any suitable mechanical linkage, including hydrostatic drive through hydraulic pumps and motors. Conceivably, four, six, eight, or more tires may be used with tracks as a drive system, but may also be used "trackless." The power takeoff may rely on a flexible shaft, spring-coil bendable shaft, universal jointed shaft and spline, or the like. Track tensioning may be done by any suitable means known in the art. Pillow bearings on bogey wheels may be replaced by a more rigid connection to stabilize tracking of the track over the bogey wheels. Solar power may be used for controls, battery charging, or the like, and collectors may be installed on any horizontal or vertical surface exposed to the sun.

The present invention may be embodied in other specific forms without departing from its purposes, functions, structures, or operational characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A tractor comprising:
a frame defining longitudinal (nominally forward and backward), lateral (nominally left and right), and transverse (nominally up and down) directions (mutually orthogonal);
the frame, comprising first and second side structures and a width adjustment structure comprising beams, each characterized by a bearing length and bearing width selected to be capable of operably connecting to the first and second side structures to fix the first and second side structures with respect to each other at each of a plurality of widths therebetween;
first and second drive systems, secured within the first and second side structures, respectively, wherein powertrain components that are used to power the first and second drive systems are disposed within or above the first and second side structures, wherein the powertrain components comprise a power supply operably connected to power the first and second drive systems.

2. The tractor of claim 1, further comprising a carrier system comprising an implement connector on each of the first and second side structures capable of selectively securing and releasing an implement to be carried by the tractor.

3. The tractor of claim 2, further comprising an implement carrier capable of mechanically adapting the implement to the implement connector.

4. The tractor of claim 3, wherein at least one of the implement carrier and the carrier system is capable of adjusting transversely to selectively engage and disengage the implement with a ground surface therebelow.

5. The tractor of claim 2, further comprising at least one of a power takeoff and electrical cables operably connected between the frame and the implement to provide energy to the implement.

6. The tractor of claim 5, wherein the electrical cables are configured to supply electrical power to a motor for powering the implement.

7. The tractor of claim 2, wherein the implement comprises a personnel carrier capable of positioning a rider in sufficient proximity to a surface of ground therebelow capable of facilitating hand work by the rider and directed to a crop in the ground.

8. The tractor of claim 1, further comprising a controller operably connected to control travel and turning of the tractor by controlling the first and second drive systems individually.

9. The tractor of claim 8, wherein the controller comprises a processor capable of receiving programming instructions capable of directing the tractor based on at least one of a pre-determined course of travel and a guided course of travel in response to physical features corresponding to a farming field being serviced by the tractor.

10. The tractor of claim 1, wherein each of the first and second drive systems comprise a track operably connected to a motor capable of driving the track independently.

11. A method of operating a tractor, the method comprising:
providing a tractor comprising a frame and first and second drive systems, wherein
the frame defines longitudinal (nominally forward and backward), lateral (nominally left and right), and transverse (nominally up and down) directions, all mutually orthogonal,
the frame comprises first and second side structures and a width adjustment, wherein the width adjustment comprises beams, extending laterally between the first and second side structures and each characterized by a bearing length and bearing width selected to be capable of operably connecting to fix the first and second side structures with respect to one another at each of a plurality of widths selectable therebetween, and
the first and second drive systems are secured within the first and second side structures, respectively, wherein powertrain components including a power supply that are used to power the first and second drive systems are disposed within or above the first and second side structures;
selecting a width corresponding to a spacing of furrows in soil corresponding to ground therebelow; and
adjusting the width adjustment to position the first and second side structures to correspond to the spacing.

12. The method of claim 11, further comprising:
selecting another width corresponding to another spacing of other furrows; and
adjusting a distance between the first and second side structures to correspond to the other furrows by operating the width adjustment.

13. The method of claim 12, further comprising operating the tractor with the first and second drive systems in the other furrows.

14. The method of claim 11, further comprising:
connecting an implement to the frame;
controlling the first and second drive systems individually along the furrows;
programming a controller to control the drive systems to pass along adjacent portions of the ground in sequence;

using the power supply to power the first and second drive systems; and programming the controller to do at least one of guiding the tractor based on data representing a mapping of the furrows and guiding the tractor based on detecting a physical feature corresponding to the furrows.

15. The method of claim 11, wherein:

the tractor comprises a carrier capable of engaging an implement to be operated with the tractor; and at least one of the implement and the carrier is capable of controllably lifting and lowering the implement with respect to the tractor for engaging with the soil.

16. The method of claim 15, wherein:

at least one of the implement and the tractor comprises an implement carrier capable of mechanically adapting the implement to the tractor for operation; and at least one of the implement carrier and the tractor is capable of adjusting the implement transversely to selectively engage and disengage the soil therebelow.

17. An apparatus capable of operating as a tractor, the apparatus comprising:

a frame defining longitudinal, lateral, and transverse directions mutually orthogonal;

the frame, comprising first and second side structures capable of interconnecting by a width adjuster extending in a lateral direction;

the width adjuster comprising beams, each characterized by a bearing length and bearing width selected to be capable of operably connecting to the first and second side structures to fix the first and second side structures with respect to each other at each of a plurality of widths therebetween; and first and second drive systems, secured within the first and second side structures, respectively, wherein powertrain components that are used to power the first and second drive systems are disposed within or above the first and second side structures.

18. The apparatus of claim 17, wherein:

the powertrain components comprise a power supply operably connected to power the first and second drive systems; and a carrier system is provided that is capable of supporting an implement and moving the implement selectively into engagement with the ground and out of engagement therewith.

19. The apparatus of claim 18, further comprising:

at least one of a power takeoff and electrical cables operably connected between the frame and the implement to provide energy to the implement;

a controller operably connected to control travel and turning of the tractor by controlling the first and second drive systems individually, wherein the controller comprises a processor capable of receiving programming instructions capable of directing the tractor based on at least one of a pre-determined course of travel and a guided course of travel in response to physical features corresponding to a farming field being serviced by the tractor; and a communication system operably connected to receive instructions from a location remote from the tractor and communicate the instructions to the controller.

20. The tractor of claim 17, wherein:

the first and second drive systems comprise motors operably connected to drive sprockets corresponding thereto and operably connected to drive tracks about the sprockets and corresponding idlers; and the frame is supported by bogey wheels capable of rolling along the tracks.

\* \* \* \* \*